(12) United States Patent
Knestel et al.

(10) Patent No.: US 12,523,135 B2
(45) Date of Patent: Jan. 13, 2026

(54) SEPARATING DEVICE AND USE OF A SEPARATING DEVICE

(71) Applicant: 3M INNOVATIVE PROPERTIES COMPANY, St. Paul, MN (US)

(72) Inventors: Peter Knestel, Dietmannsried (DE); Reinhold Joerg, Sulzberg (DE); Wolfgang M. Rauch, Argenbühl (DE); Dietrich Lange, Weitnau (DE)

(73) Assignee: 3M Innovative Properties Company, St. Paul, MN (US)

( * ) Notice: Subject to any disclaimer, the term of this patent is extended or adjusted under 35 U.S.C. 154(b) by 480 days.

(21) Appl. No.: 17/264,536

(22) PCT Filed: Aug. 1, 2019

(86) PCT No.: PCT/IB2019/056584
§ 371 (c)(1),
(2) Date: Jan. 29, 2021

(87) PCT Pub. No.: WO2020/026197
PCT Pub. Date: Feb. 6, 2020

(65) Prior Publication Data
US 2021/0332687 A1 Oct. 28, 2021

(30) Foreign Application Priority Data
Aug. 1, 2018 (EP) .................................. 18186818

(51) Int. Cl.
*E21B 43/34* (2006.01)
*B01D 29/46* (2006.01)
(Continued)

(52) U.S. Cl.
CPC .............. *E21B 43/35* (2020.05); *B01D 29/46* (2013.01); *B01D 39/2068* (2013.01); *B01D 46/406* (2013.01); *E21B 43/086* (2013.01)

(58) Field of Classification Search
CPC ......... E21B 43/35; E21B 43/08; E21B 43/086
See application file for complete search history.

(56) References Cited

U.S. PATENT DOCUMENTS 1,705,848 A * 3/1929 Austin .................. E21B 43/088
210/497.01
4,752,394 A * 6/1988 McKenzie ............. B01D 29/46
210/488
(Continued)

FOREIGN PATENT DOCUMENTS

| EP | 3336305 | 6/2018 | |
| WO | WO2016-018821 | 2/2016 | |
| WO | WO-2016018821 A1 * | 2/2016 | ........... E21B 43/086 |

OTHER PUBLICATIONS

1507 Extended EP Search Report for E18186818.3, PCT/IB2019/056584, Feb. 7, 2019, 6 pages.
(Continued)

*Primary Examiner* — Nicole Coy
*Assistant Examiner* — Nicholas D Wlodarski
(74) *Attorney, Agent, or Firm* — Carlos M. Téllez Rodríguez; 3M Innovative Properties Company

(57) ABSTRACT

The present disclosure relates to a separating device for removing solid particles from fluids, and to the use of said separating device for removing solid particles from fluids.

20 Claims, 22 Drawing Sheets

(51) Int. Cl.
*B01D 39/20* (2006.01)
*B01D 46/40* (2006.01)
*E21B 43/08* (2006.01)

(56) References Cited

U.S. PATENT DOCUMENTS

| | | |
|---|---|---|
| 5,249,626 A | 10/1993 | Gibbins |
| 8,662,167 B2 | 3/2014 | Wildhack |
| 8,833,447 B2 | 9/2014 | Mussig |
| 8,893,781 B2 | 11/2014 | Kayser |
| 10,415,351 B2 | 9/2019 | Lange |

OTHER PUBLICATIONS

International Search report for PCT International Application No. PCT/IB2019/056584 mailed on Jan. 3, 2020, 5 pages.

\* cited by examiner

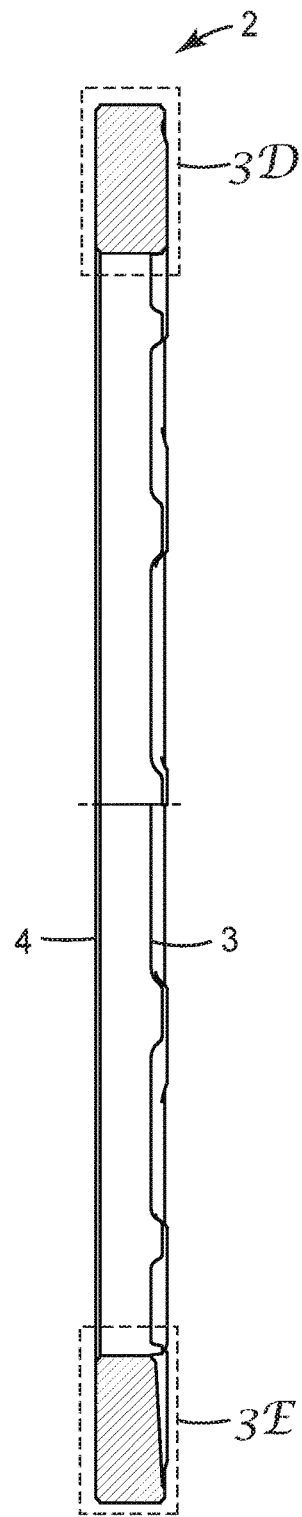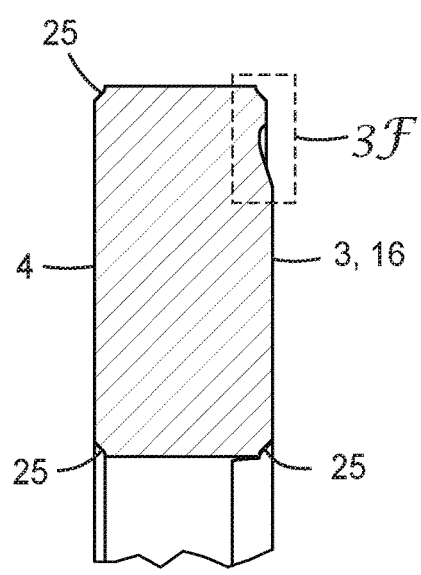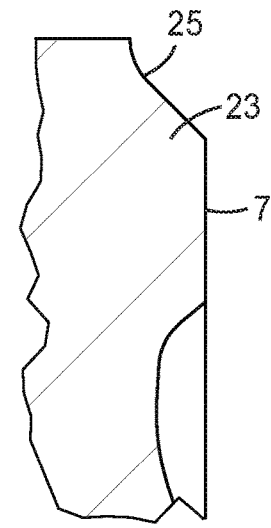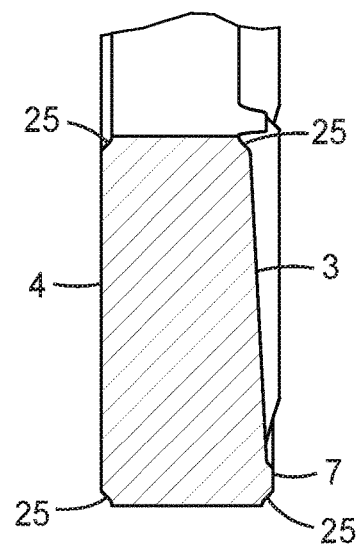
FIG. 3C
FIG. 3D
FIG. 3F
FIG. 3E

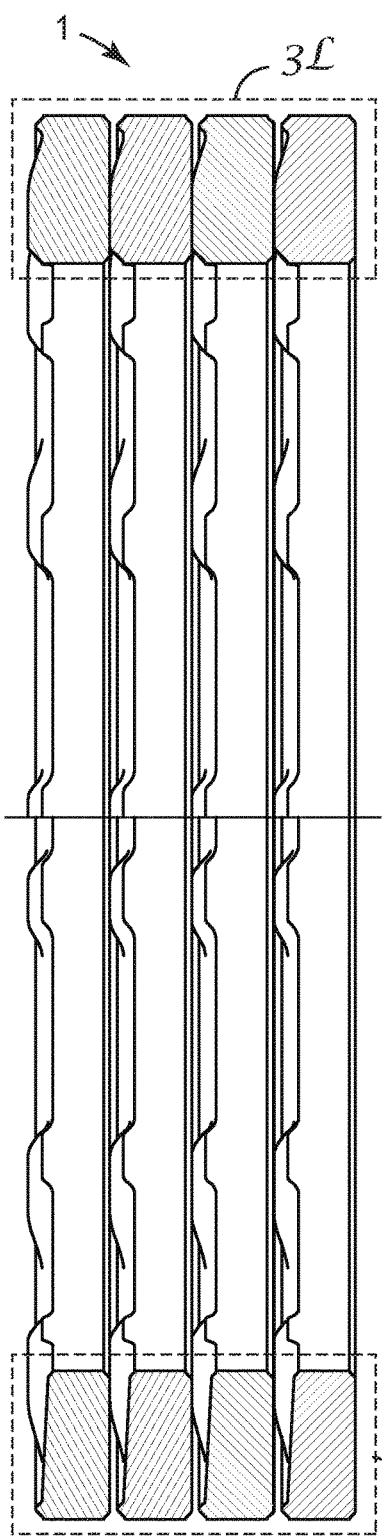
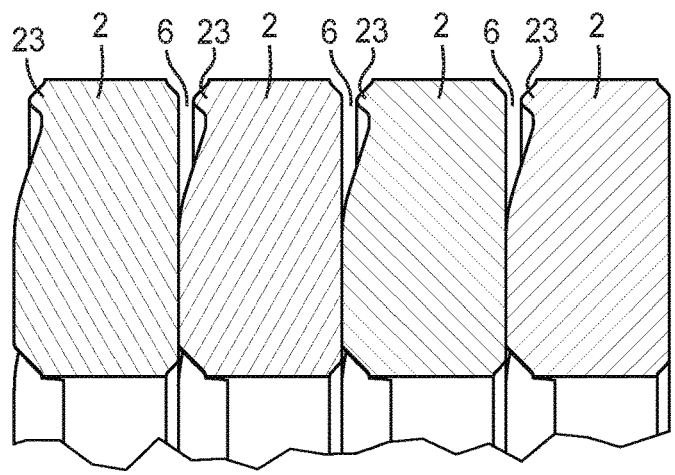
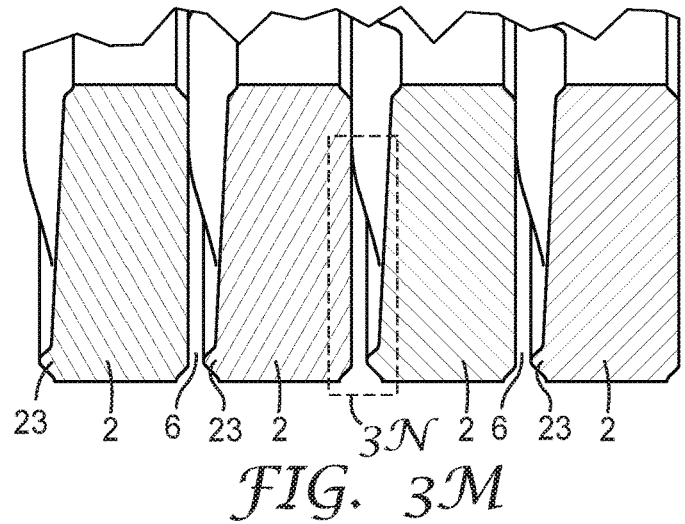
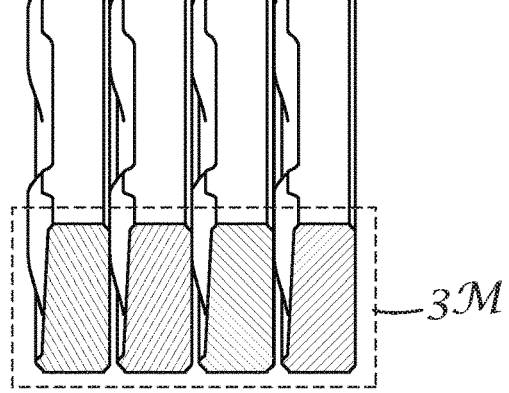
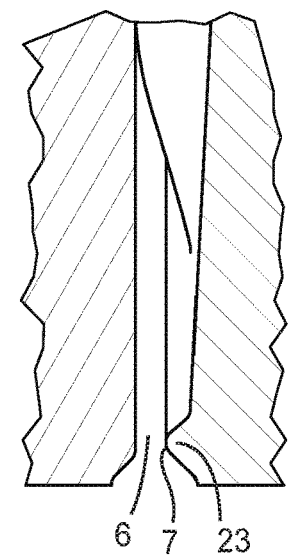
FIG. 3L
FIG. 3M
FIG. 3K
FIG. 3N

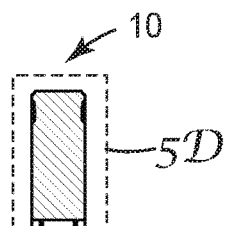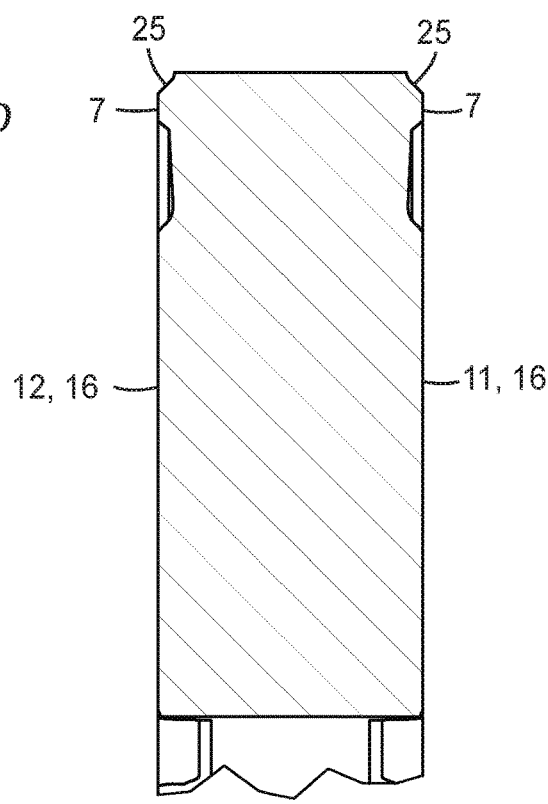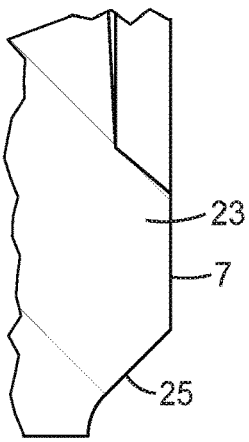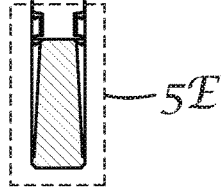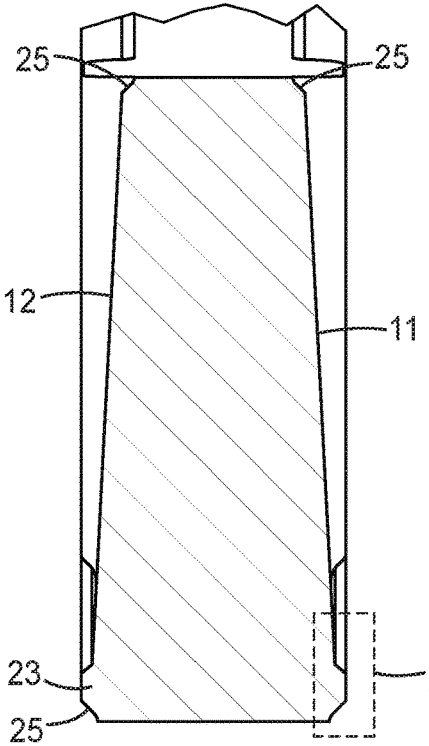
FIG. 5C
FIG. 5D
FIG. 5F
FIG. 5E

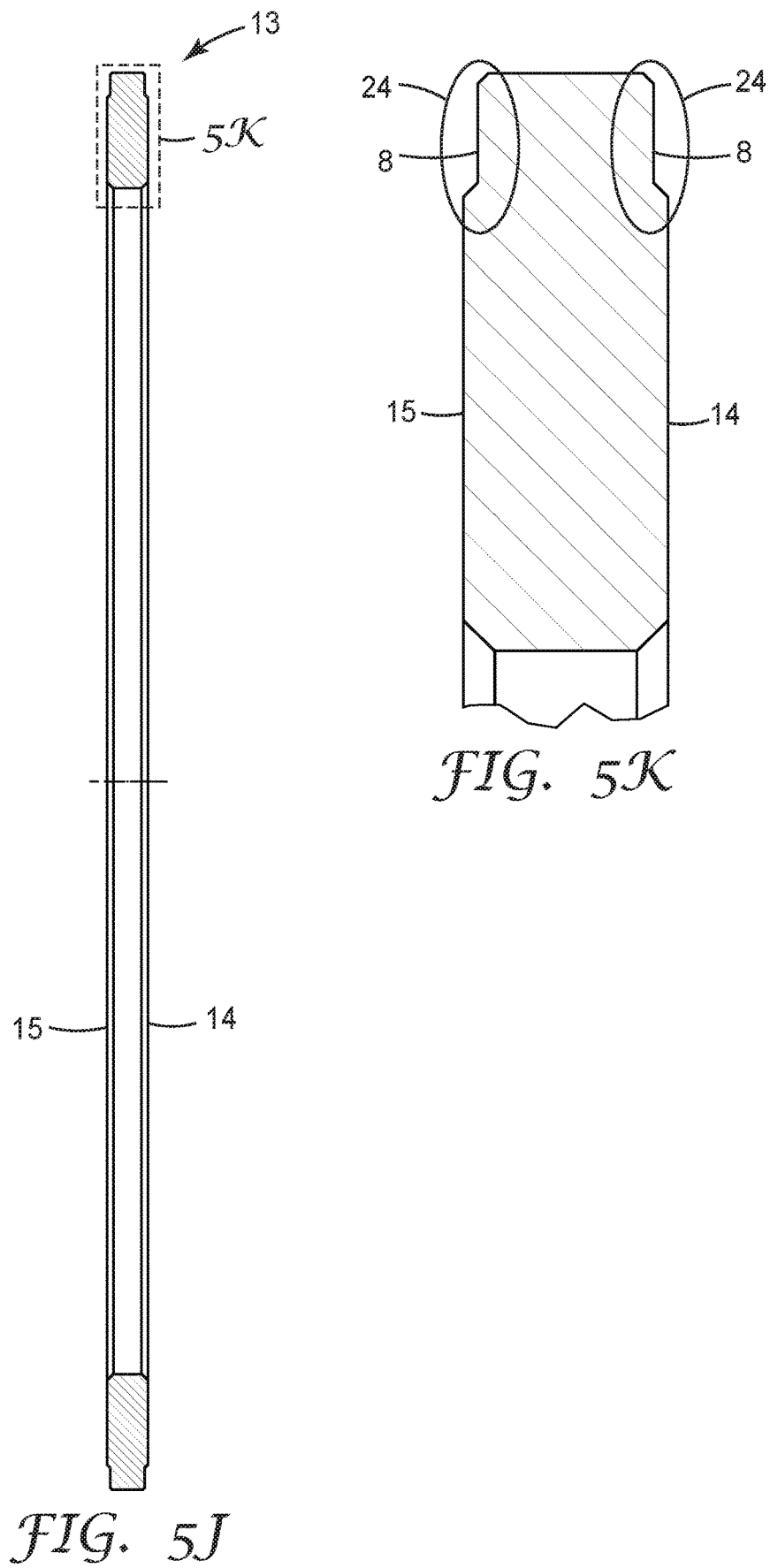

SEPARATING DEVICE AND USE OF A SEPARATING DEVICE

CROSS REFERENCE TO RELATED APPLICATIONS

This application is a national stage filing under 35 U.S.C. 371 of PCT/IB2019/056584, filed Aug. 1, 2019, which claims the benefit of European Application No. 18186818.3, filed Aug. 1, 2018, the disclosure of which is incorporated by reference in their entirety herein.

TECHNICAL FIELD

The present disclosure relates to a separating device for the removal of solid particles from a fluid.

BACKGROUND

Such separating devices are required in many oil and gas extraction wells. Mineral oil and natural gas are stored in naturally occurring underground reservoirs, the oil or gas being distributed in more or less porous and permeable mineral layers. The aim of every oil or gas drill hole is to reach the reservoir and exploit it in such a way that, as far as possible, only saleable products such as oil and gas are extracted, while undesired by-products are minimized or even avoided completely. The undesired by-products in oil and gas extraction include solid particles such as sands and other mineral particles that are entrained from the reservoir up to the borehole by the liquid or gas flow.

Since the mineral sands are often abrasive, the influx of such solids into the production tubing and pump cause considerable undesired abrasive and erosive wear on all of the technical internals of the borehole. It is therefore endeavoured to free the production flow of undesired sands directly after it leaves the reservoir, that is to say while it is still in the borehole, by filter systems.

Problems of abrasion and erosion in the removal of solid particles from liquid and gas flows are not confined to the oil and gas industry, but may also occur in the extraction of water. Water may be extracted for the purpose of obtaining drinking water or else for the obtainment of geothermal energy. The porous, often loosely layered reservoirs of water have the tendency to introduce a considerable amount of abrasive particles into the material that is extracted. In these applications too, there is the need for abrasion- and erosion-resistant filters. Also in the extraction of ore and many other minerals, there are problems of abrasion and erosion in the removal of solid particles from liquid and gas flows.

In oil and gas extraction, the separation of undesired particles is usually achieved today by using filters that are produced by spirally winding and welding steel forming wires onto a perforated basepipe. Such filters are referred to as "wire wrap filters". Another commonly used type of construction for filters in oil and gas extraction is that of wrapping a perforated basepipe with metal screening meshes. These filters are referred to as "metal mesh screens". Both methods provide filters with effective screen apertures of 75 μm to 350 μm. Depending on the type of construction and the planned intended use of both these types of filter, the filtering elements are additionally protected from mechanical damage during transport and introduction into the borehole by an externally fitted, coarse-mesh cage. The disadvantage of these types of filter is that, under the effect of the abrasive particles flowing at high speed, metal structures are subject to rapid abrasive wear, which quickly leads to destruction of the filigree screen structures. Such high-speed abrasive flows often occur in oil and/or gas extraction wells, which leads to considerable technical and financial maintenance expenditure involved in changing the filters. There are even extraction wells which, for reasons of these flows, cannot be controlled by the conventional filtering technique, and therefore cannot be commercially exploited. Conventional metallic filters are subject to abrasive and erosive wear, since steels, even if they are hardened, are softer than the particles in the extraction wells, which sometimes contain quartz.

In order to counter the abrasive flows of sand with abrasion-resistant screen structures, U.S. Pat. Nos. 8,893, 781 B2, 8,833,447 B2, 8,662,167 B2 and WO 2016/018821 A1 propose filter structures in which the filter gaps, that is to say the functional openings of the filter, are created by stacking specially formed densely sintered annular discs of a brittle-hard material, preferably of a ceramic material. In this case, spacers are arranged on the upper side of annular discs, distributed uniformly over the circular circumference of the discs.

The annular discs are made by a near net-shape process without complex machining. In WO 2016/018821 A1, the annular discs having planiform spacers can be machined with a two-sided facing on their upper side and underside. The two-sided facing can be performed by lapping, flat honing and grinding. The upper side of the annular discs remains as an as-sintered surface in the regions between and outside of the spacers, and at the filter gap.

The filter gap or separating gap, which is also referred to as "slot opening", has usually a height in the range of 100 to 350 μm. A disadvantage of the stack of annular discs proposed in U.S. Pat. Nos. 8,893,781 B2, 8,833,447 B2, 8,662,167 B2 and WO 2016/018821 A1 is that small deviations from the theoretic shape will cause deviation of the slot opening, when measured at various positions over the circumference of the annular disc, and of the slot opening distribution, when measured between different pairs of adjacent annular discs within the stack of annular discs. In the manufacturing process of the ceramic rings of pressing and sintering of ceramic powders, small unavoidable inhomogeneities of the distribution of the green density in the dye-pressed part will lead to small deviations from the desired exact geometry of the rings after shrinkage by sintering. During the sintering process, the rings are susceptible to warping. Due to the deviations from the exact geometry and the warping, it is often difficult to meet the desired specification of the slot opening tolerance. For slot openings being larger than 350 μm, the effect of warping increases so that slot openings of this size are not possible to achieve.

Therefore, there is still a need to provide an improved separating device for the removal of solid particles from fluids, in particular from oil, gas and water. Particularly, there is a need to provide a separating device having an improved slot opening tolerance, and to provide a separating device having slot openings larger than 350 μm.

As used herein, "a", "an", "the", "at least one" and "one or more" are used interchangeably. The term "comprise" shall include also the terms "consist essentially of" and "consists of".

SUMMARY

In a first aspect, the present disclosure relates to a separating device for removing solid particles from fluids, comprising a stack of at least three annular discs defining a central annular region along a central axis, each annular disc having an upper side and an underside, wherein the upper side of each annular disc each has one or more spacers, and wherein the upper side of each annular disc contacts the underside of the adjacent annular disc defining a separating gap, and wherein the one or more spacers have a planar contact area with the adjacent annular disc, and wherein the upper side of each annular disc has an elevation at the separating gap.

In another aspect, the present disclosure also relates to a separating device for removing solid particles from fluids, comprising a stack of at least three annular discs defining a central annular region along a central axis, each annular disc having an upper side and an underside, wherein the upper side and the underside of every second annular disc in the stack each has one or more spacers, and wherein the upper side and the underside of the respectively adjacent annular discs do not comprise any spacers, and wherein the upper side of each annular disc contacts the underside of the adjacent annular disc defining a separating gap, and wherein the one or more spacers have a planar contact area with the adjacent annular disc, and wherein every upper side of an annular disc which has one or more spacers has an elevation at the separating gap, and wherein every underside of an annular disc which has one or more spacers has an elevation at the separating gap.

In yet a further aspect, the present disclosure relates to the use of a separating device as disclosed herein for removing solid particles from fluids
  in a process for extracting fluids from extraction wells, or
  in water or in storage installations for fluids, or
  in a process for extracting ores and minerals.

With the separating device disclosed herein, the tolerance of the height of the slot opening, i.e. the tolerance of the height of the filter gap or separating gap, or in other words the tolerance of the filter width, when measured between different pairs of adjacent annular discs within the stack of annular discs, can be improved. The tolerance of the height of the separating gap may be less than +/−62 μm, or +/−50 μm or less, or +/−38 μm or less, or +/−25 μm or less, of the average height of the separating gap, whereas with the known separating devices of WO 2016/018821 A1, U.S. Pat. Nos. 8,893,781 B2, 8,833,447 B2 and 8,662,167 B2, tolerances of the height of the separating gap will generally be larger than +/−62 μm. The average height of the separating gap is the mean value of all individual heights of the separating gap when measured between each pair of adjacent annular discs within the stack of annular discs, wherein this measurement is carried out along a line on the lateral surface of the stack of annular discs parallel to the central axis.

Furthermore, in some embodiments of the present disclosure, larger slot openings of more than 350 μm and up to about 1000 μm are possible, whereas with the known separating devices of WO 2016/018821 A1, U.S. Pat. Nos. 8,893,781 B2, 8,833,447 B2 and 8,662,167 B2, slot openings with a height of more than 350 μm and with a tolerance of the height of the slot opening of less than +/−62 μm are difficult to achieve.

In addition, in some embodiments of the separating device disclosed herein, the open flow area can be increased.

BRIEF DESCRIPTION OF THE DRAWINGS

The present disclosure is explained in more detail on the basis of the drawings, in which FIG. 1 schematically shows the overall view of a separating device as disclosed herein.

DETAILED DESCRIPTION

The separating device as disclosed herein may further comprise, alone or in combination,
  a perforated pipe, which is located inside the concentric stack of at least three annular discs and on which the annular discs are stacked,
  an end cap at the upper end of the central annular region and an end cap at the lower end of the central annular region,
  a shroud for protection from mechanical damage.

Preferred embodiments and details of the separating device of the present disclosure are explained in more detail below with reference to the drawings.

Figure 1:
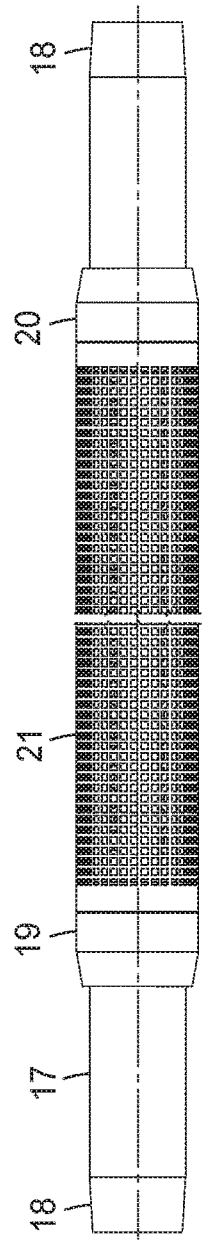
Figure 2:
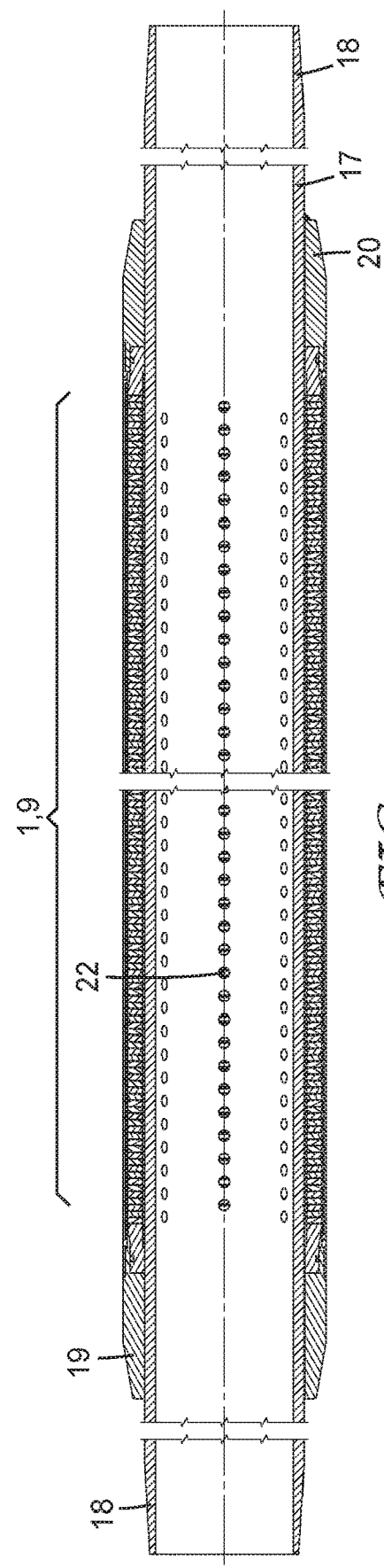
FIG. 2 shows a cross-sectional view of a separating device as disclosed herein.

FIG. 1 shows the overall view of a separating device according to the present disclosure. FIG. 2 shows a cross-sectional view of a separating device according to the present disclosure. The separating device according to the present disclosure comprises a stack of at least three annular discs defining a central annular region 1, 9 along a central axis. The separating device may comprise a perforated pipe 17, on which the annular discs are stacked. The perforated pipe 17 with perforations 22 is located inside the stack 1, 9 of annular discs and is also referred to hereinafter as the basepipe. Usually provided at both ends of the perforated pipe 17 are threads 18, by way of which the separating device can be connected to further components, either to further separating devices or to further components of the extraction equipment. The separating device may comprise an end cap 19 at the upper end of the central annular region and an end cap 20 at the lower end of the central annular region 1, 9, the end caps being firmly connected to the basepipe 17. The separating device may further comprise a tubular shroud 21 (see FIG. 1) that can be freely passed through by a flow. The shroud 21 protects the central annular region from mechanical damage during handling and fitting into the borehole.

For better understanding, and since the separating device according to the present disclosure is generally introduced into an extraction borehole in vertical alignment, the terms "upper" and "lower" are used here, but the separating device may also be positioned in horizontal orientation in the extraction borehole (in which case, upper typically would refer to the most upstream portion and lower would refer to the most downstream portion of the separating device, when in service).

The separating device according to the present disclosure comprises a stack of at least three annular discs defining a central annular region 1, 9 (see FIGS. 2, 3K, 4K and 5Q) along a central axis. The annular discs 2, 10, 13 (see FIGS. 3A-3H, 4A-4H and 5A-5N) have an upper side 3, 11, 14 and an underside 4, 12, 15 (see FIGS. 3C, 4C, 5C and 5M).

Figure 3A:
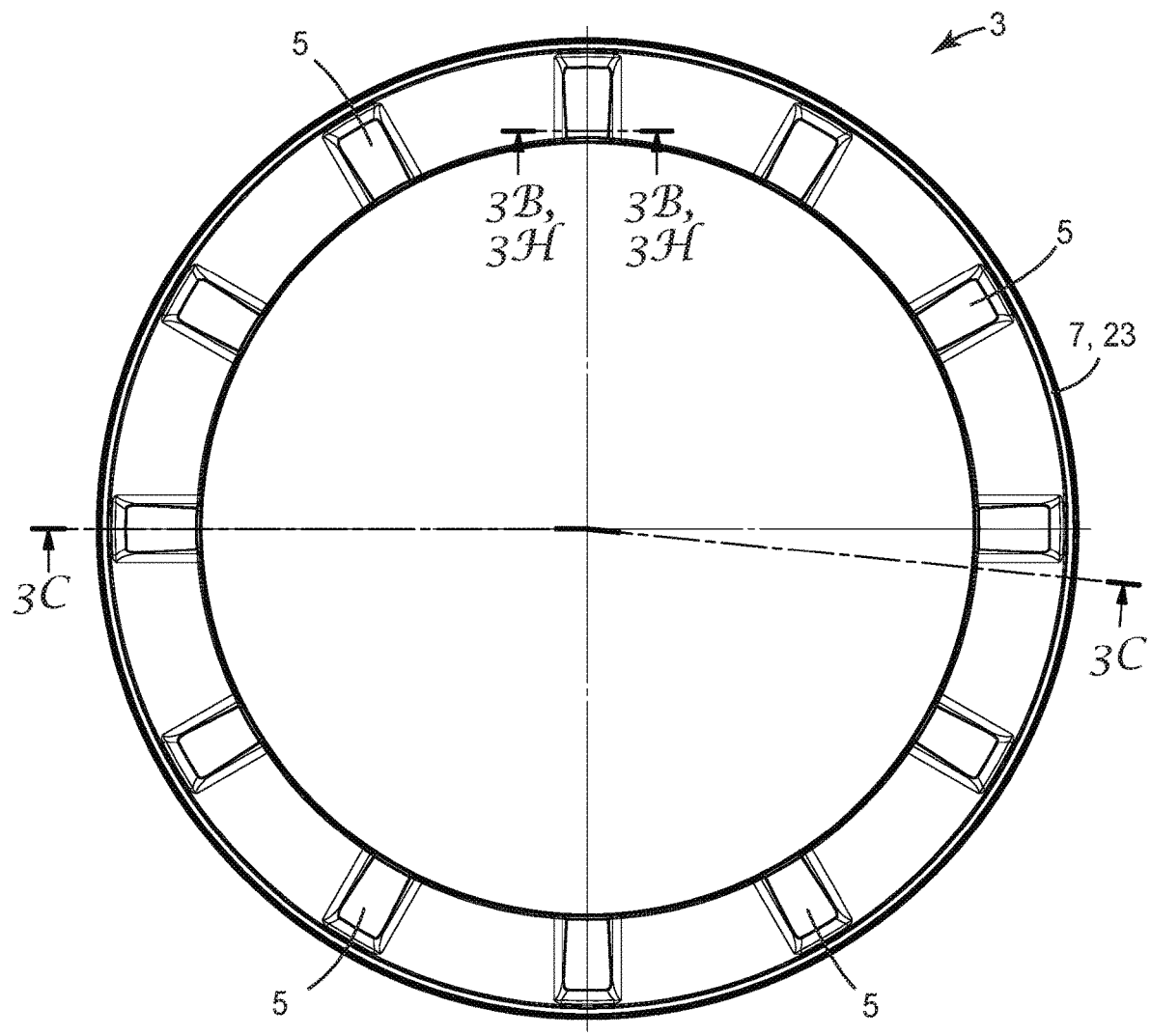
FIGS. 3A-3P show various details of the stack of annular discs of an embodiment of a separating device as disclosed herein.
Figure 4A:
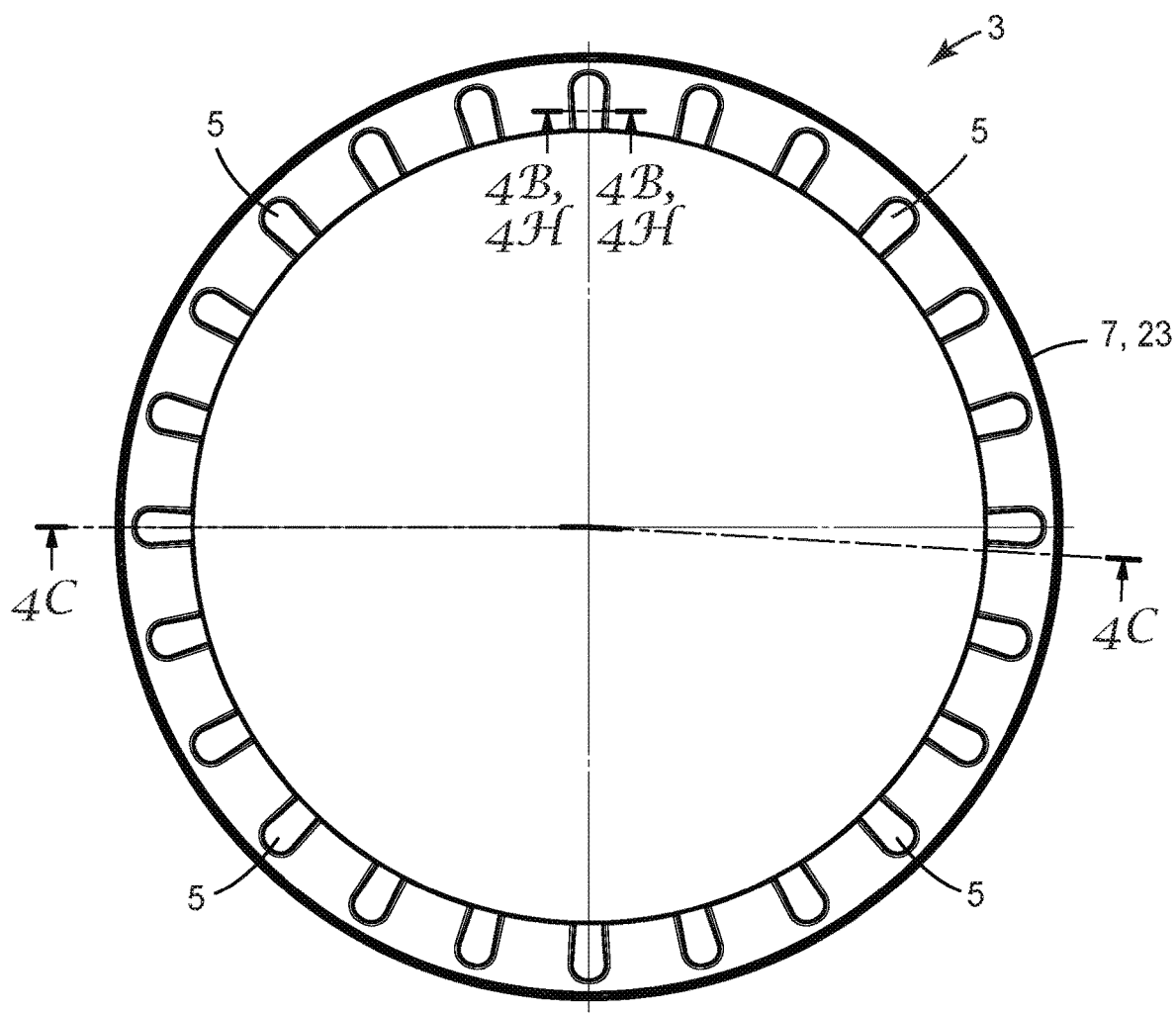
FIGS. 4A-4P show various details of the stack of annular discs of a further embodiment of a separating device as disclosed herein.
Figure 4B:
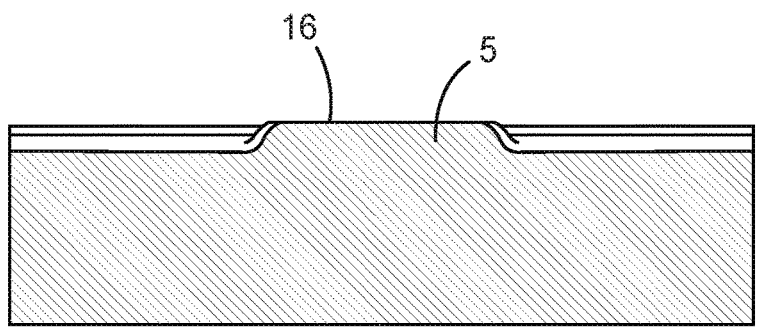
Figure 4C:
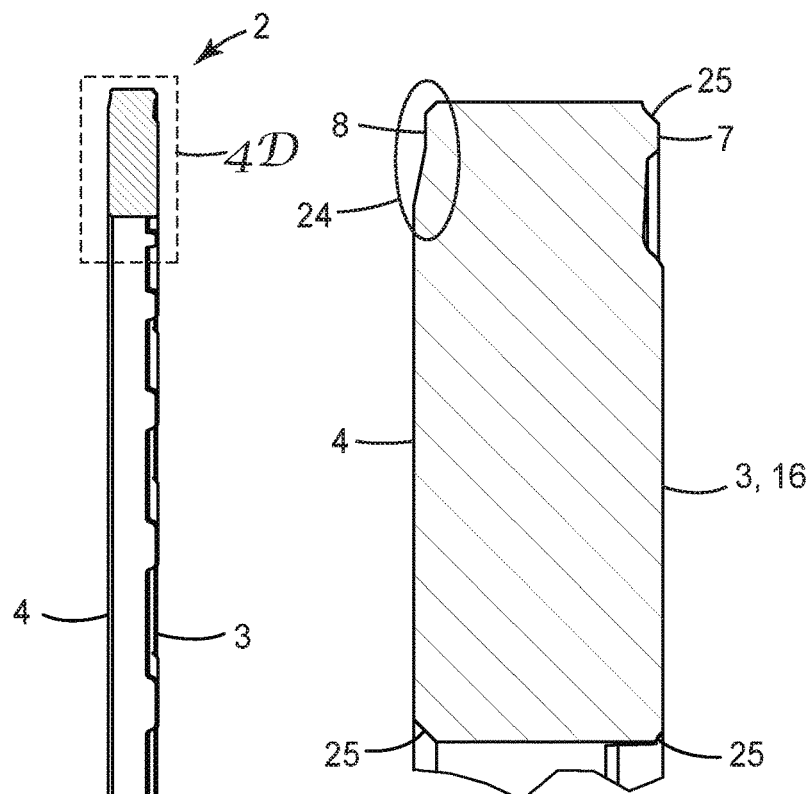

In some embodiments, the upper side 3 of each annular disc 2 each has one or more spacers 5 (see FIGS. 3A, 4A), and the underside 4 of each annular disc does not comprise any spacers (see FIGS. 3C, 4C). The upper side 3 of each annular disc 2 contacts the underside 4 of the adjacent annular disc, defining a separating gap 6 (see FIGS. 3K-3M, 4K-4M).

The contact area 16 of the spacers 5 is planar, so that the spacers 5 have a planar contact area with the adjacent annular disc (see FIGS. 3D, 3H, 4D, 4H). The planar contact area 16 is in contact with the adjacent underside 4 of the adjacent annular disc. The annular discs are stacked in such a way that between the individual discs there is in each case a separating gap 6 for the removal of solid particles.

The upper side 3 of each annular disc 2 may have only one spacer 5. In this case, the spacers 5 of the annular discs 2 are stacked in such a way that they lie on top of each other. Typically, the upper side 3 of each annular disc 2 has two or more spacers 5 which are distributed over the circumference of the upper side 3 of the annular discs 2.

The upper side 3 of each annular disc 2 has an elevation 23 at the separating gap 6 (see FIGS. 3F, 3H, 4F, 4H). The elevation 23 is along the circumference of the annular disc 2.

The underside 4 of each annular disc 2 may be formed at right angles to the central axis.

Figure 4D:
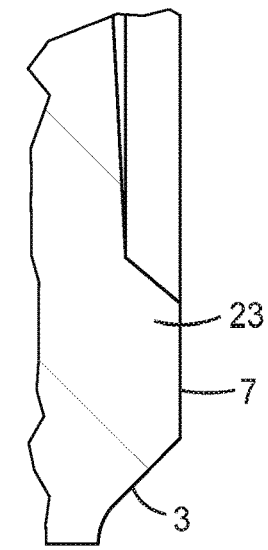
Figure 4E:
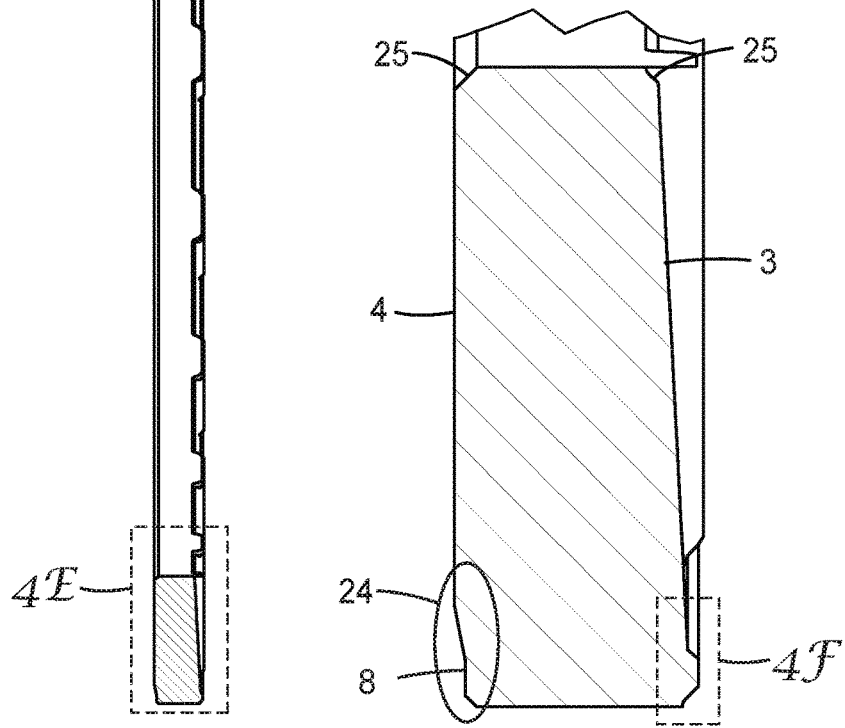
Figure 4F:
Figure 4G:
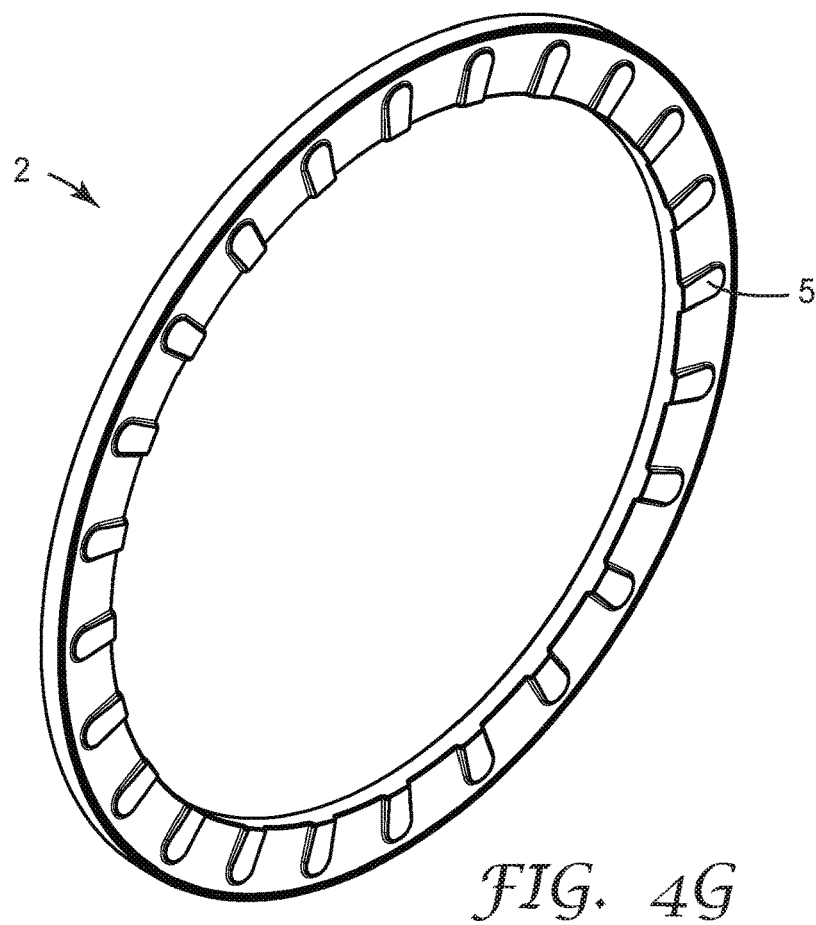
Figure 4H:
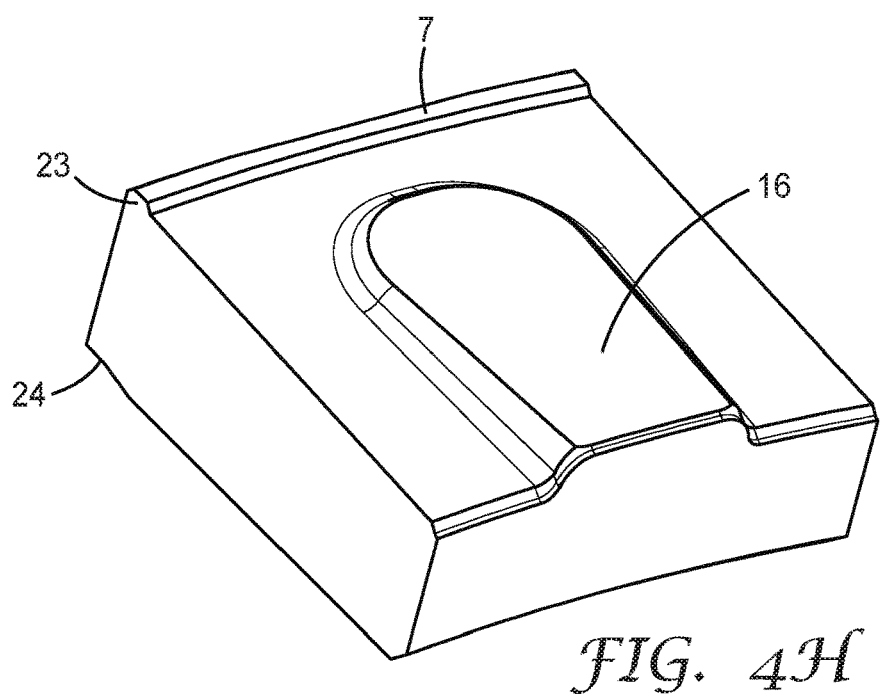

The underside 4 of each annular disc 2 may have a recess 24 at the separating gap 6 (see FIGS. 4D, 4E, 4H).

In some further embodiments, the upper side 11 and the underside 12 of every second annular disc 10 in the stack each has one or more spacers 5 (see FIGS. 5A-5G). The upper side 14 and the underside 15 of the respectively adjacent annular discs 13 do not comprise any spacers (see FIGS. 5I-5N). The upper side 11, 14 of each annular disc 10, 13 contacts the underside 12, 15 of the adjacent annular disc, defining a separating gap 6 (see FIGS. 5Q-5S).

The upper side 11 and the underside 12 of each annular disc 10 each may have only one spacer 5. Typically, the upper side 11 and the underside 12 of each annular disc 10 each has two or more spacers 5 which are distributed over the circumference of the upper side 11 and the upper side 12 of the annular discs 10.

Figure 5A:
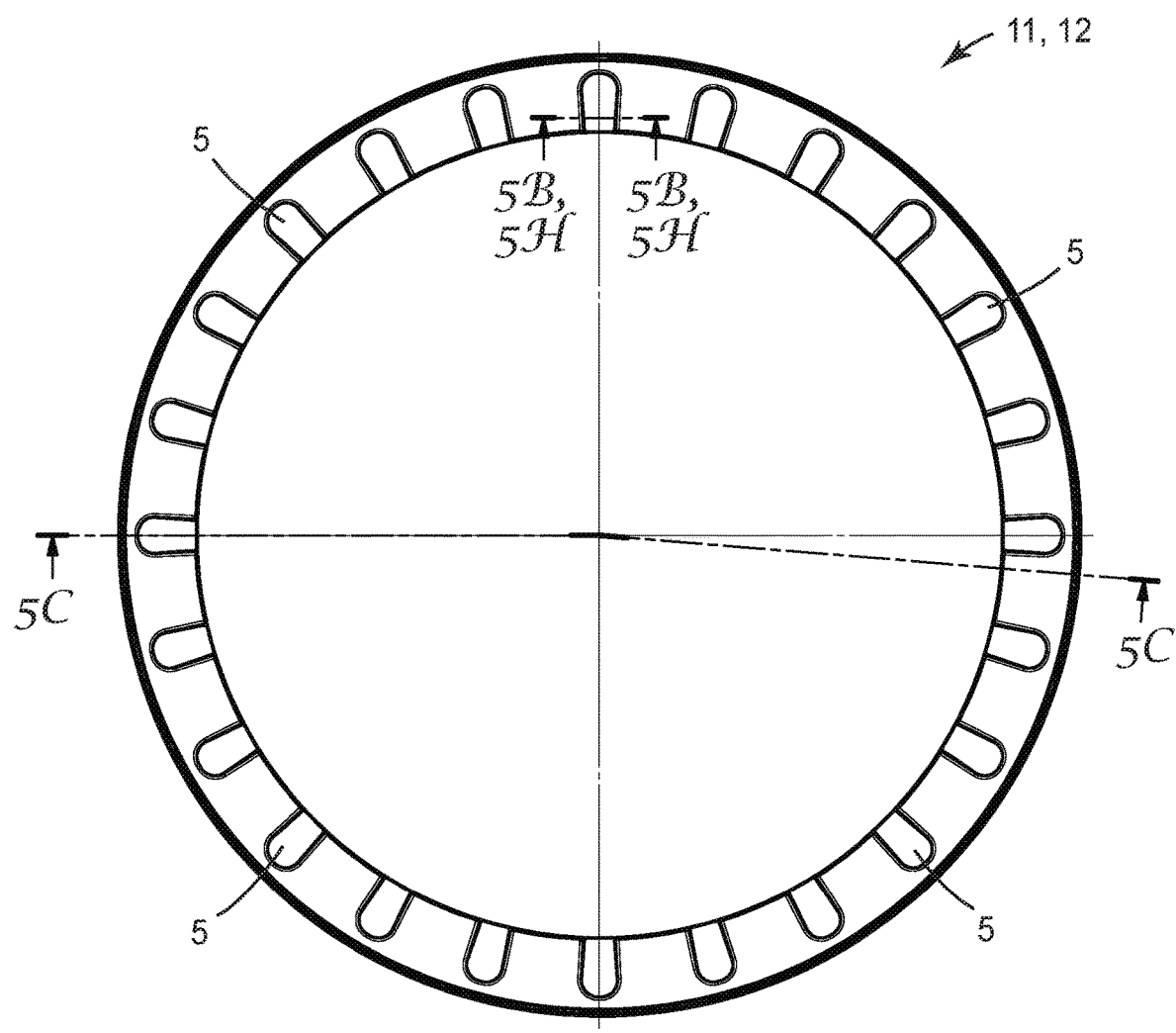
FIGS. 5A-5U show various details of the stack of annular discs of yet a further embodiment of a separating device as disclosed herein.
Figure 5B:
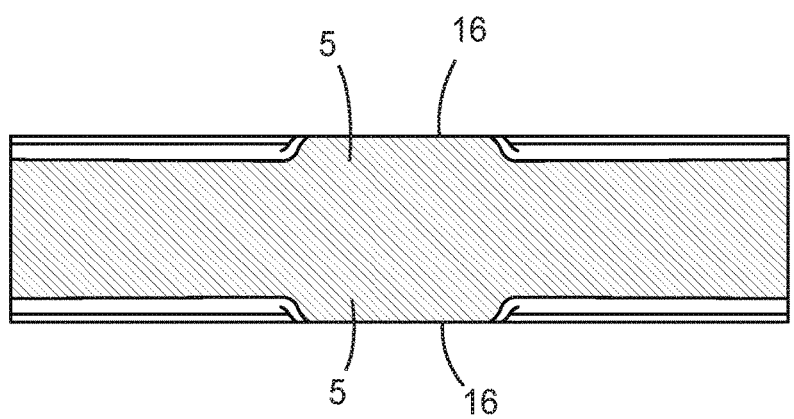
Figure 5G:
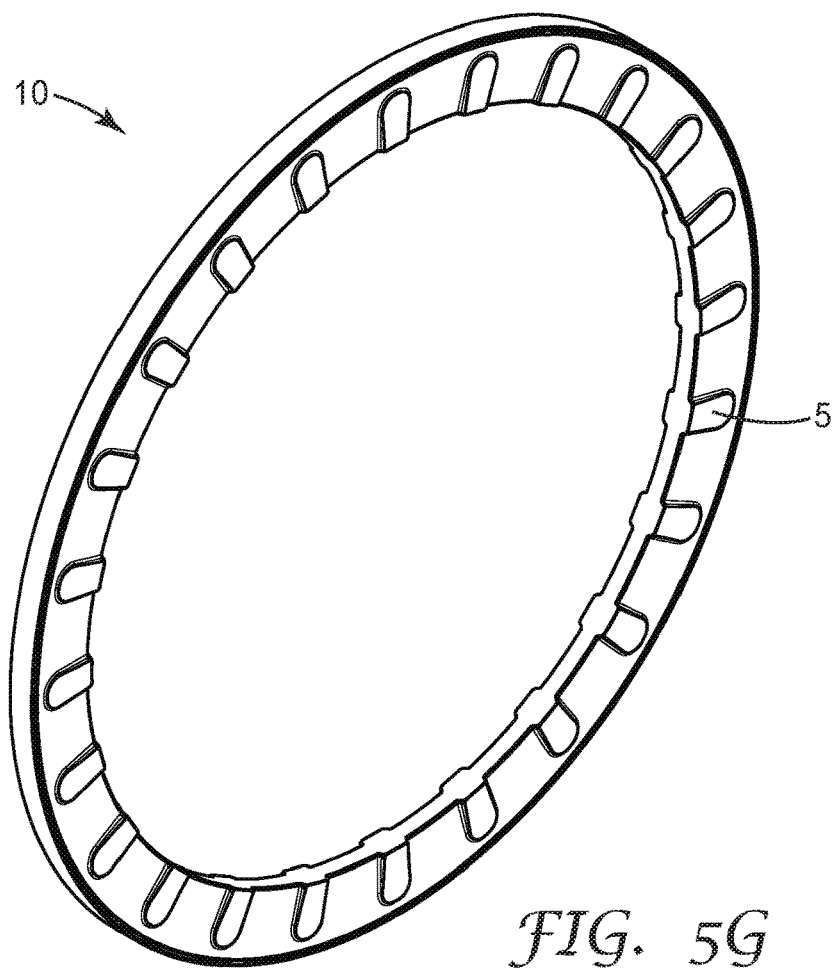
Figure 5H:
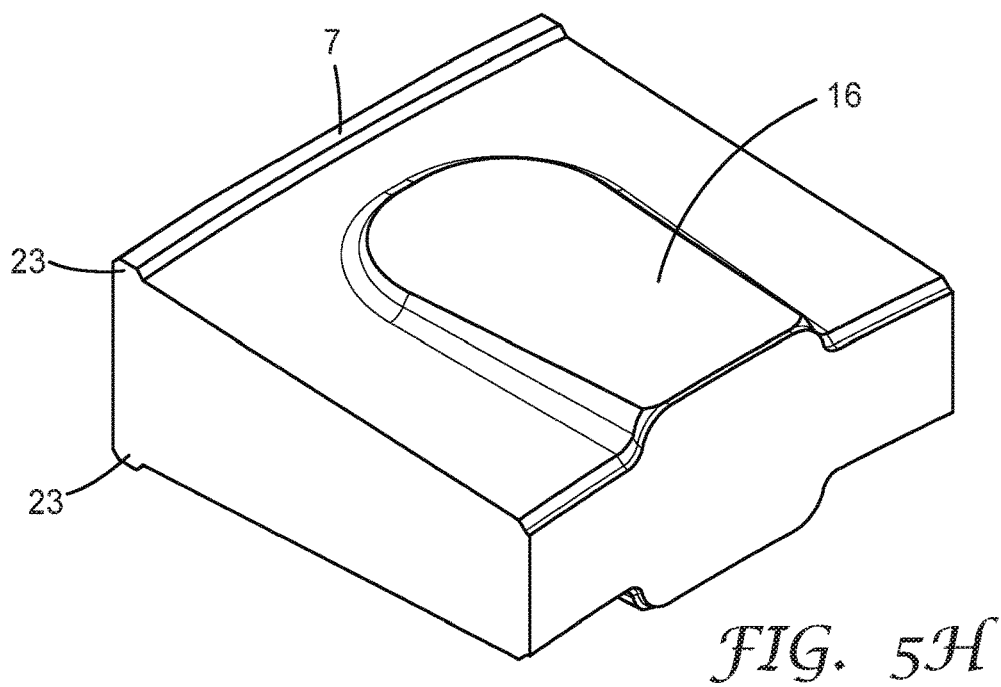

The contact area 16 of the spacers 5 is planar, so that the spacers 5 have a planar contact area with the adjacent annular disc (see FIGS. 5D, 5H). The planar contact area 16 of the spacers 5 of the upper side 11 of an annular disc 10 is in contact with the underside 15 of the adjacent annular disc, and the planar contact area 16 of the spacers 5 of the underside 12 of an annular disc 10 is in contact with the upper side 14 of the adjacent annular disc. The annular discs are stacked in such a way that between the individual discs there is in each case a separating gap 6 for the removal of solid particles.

Every upper side 11 of an annular disc 10 which has one or more spacers 5 has an elevation 23 at the separating gap 6 (see FIGS. 5F, 5H). Every underside 12 of an annular disc 10 which has one or more spacers 5 has an elevation 23 at the separating gap 6 (see FIGS. 5D, 5E, 5H). The elevation 23 is along the circumference of the annular disc 10.

Every upper side 14 of an annular disc 13 which does not comprise any spacers may be formed at right angles to the central axis, and every underside 15 of an annular disc 13 which does not comprise any spacers may be formed at right angles to the central axis.

Figure 5I:
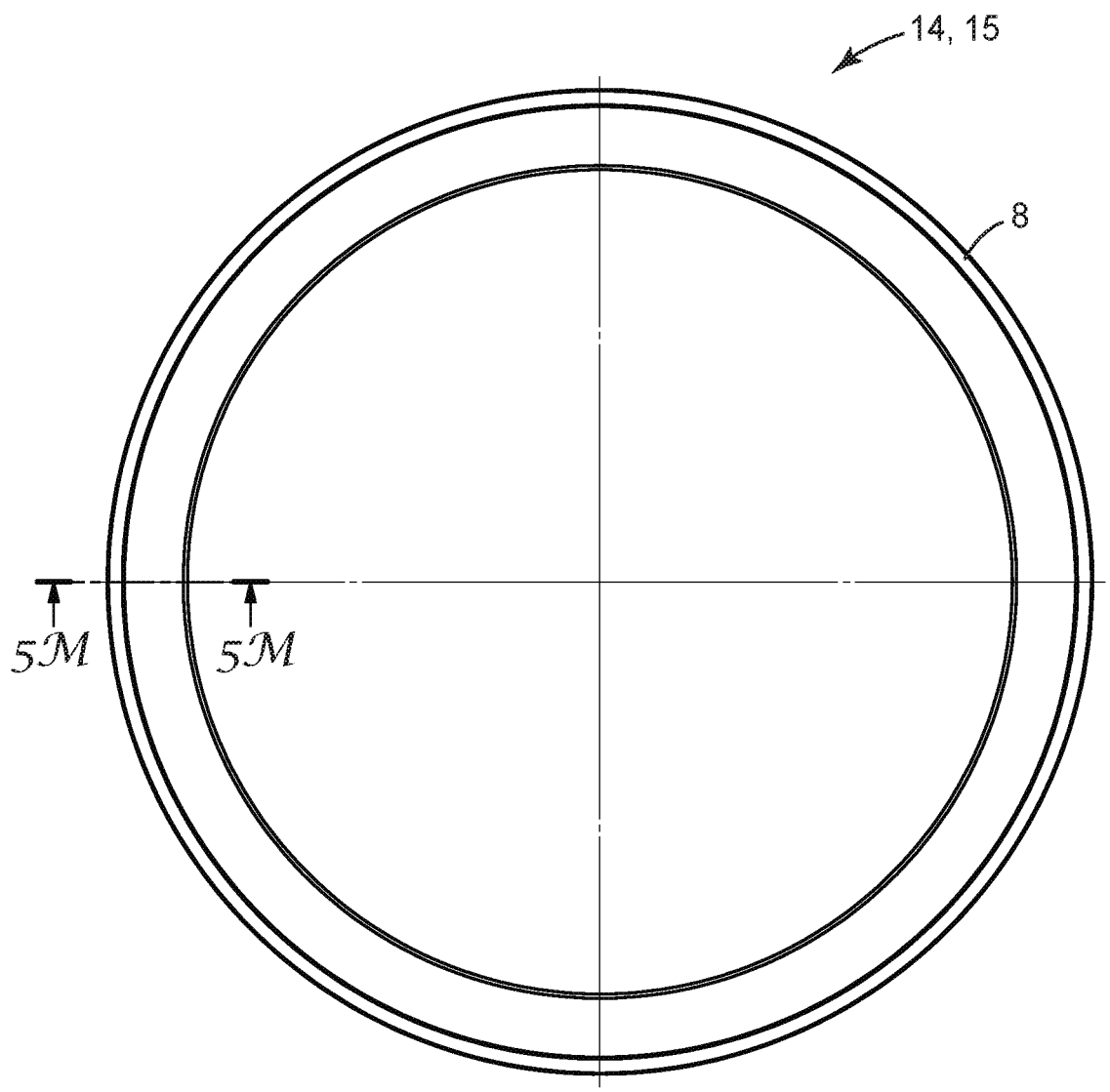
Figure 5L:
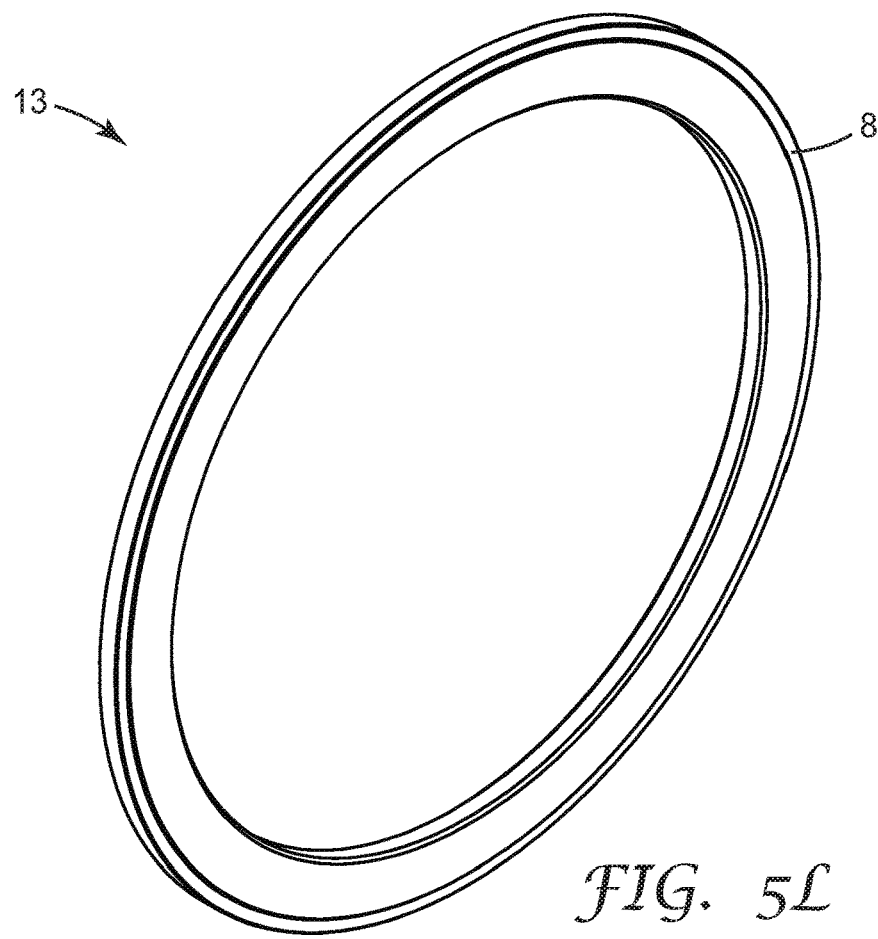
Figure 5M:
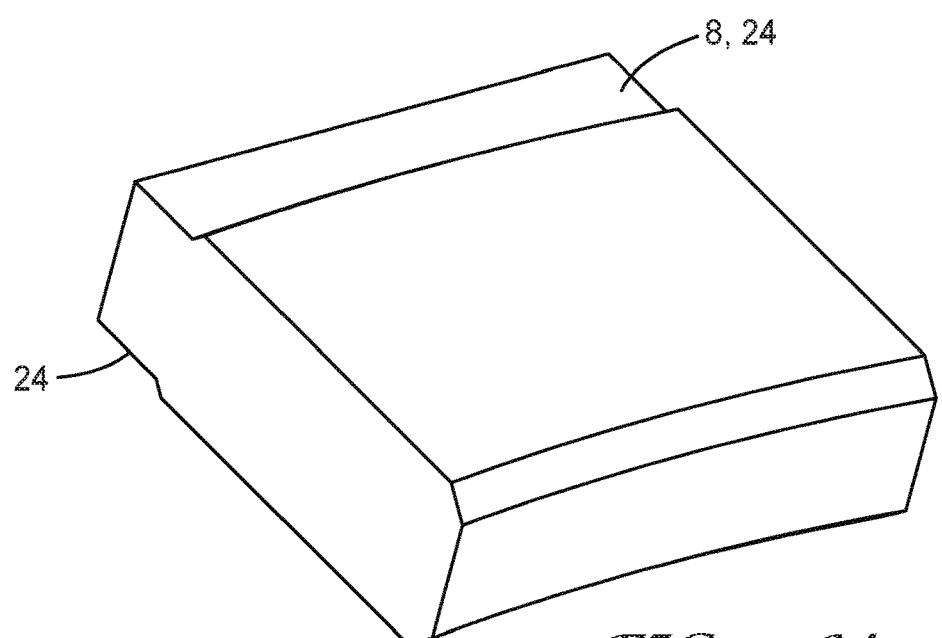

Every upper side 14 of an annular disc 13 which does not comprise any spacers may have a recess 24 at the separating gap 6 (see FIGS. 5K, 5M). Every underside 15 of an annular disc 13 which does not comprise any spacers may have a recess 24 at the separating gap 6 (see FIGS. 5K, 5M).

The elevation 23 may comprise an area 7 having a flat surface. The elevation 23 at the separating gap 6, on the upper side 3 of each annular disc 2, may comprise an area 7 having a flat surface (see FIGS. 3D-3F, 4D-4F). The elevation 23 at the separating gap 6, on every upper side 11 and on every underside 12 of an annular disc 10 which has one or more spacers, may comprise an area 7 having a flat surface (see FIGS. 5D-5F).

The area 7 at the upper side 3 of an annular disc 2 may be plane-parallel to the underside 4 of the respective annular disc (see FIGS. 3E, 4E). The area 7 at the upper side 11 of an annular disc 10 may be plane-parallel to the underside 12 of the respective annular disc (see FIG. 5E), which means plane-parallel to the area 7 at the underside 12 and the planar contact area 16 of the spacers of the underside 12 of the respective annular disc. The area 7 at the underside 12 of an annular disc 10 may be plane-parallel to the upper side 11 of the respective annular disc, which means plane-parallel to the area 7 at the upper side 11 and the planar contact area 16 of the spacers of the upper side 11 of the respective annular disc. The area 7 at the upper side 3, 11 of an annular disc 2, 10 or at the underside 12 of an annular disc 10 may also be inwardly or outwardly sloping.

The recess 24 may comprise an area 8 having a flat surface. The recess 24 at the separating gap 6, on the underside 4 of each annular disc 2, may comprise an area 8 having a flat surface (see FIGS. 4D-4E). The recess 24 at the separating gap 6, on every upper side 14 and on every underside 15 of an annular disc 13 which does not comprise any spacers, may comprise an area 8 having a flat surface (see FIGS. 5K, 5M).

The area 8 at the underside 4 of an annular disc 2 may be plane-parallel to the upper side 3 of the respective annular disc (see FIG. 4D), which means plane-parallel to the area 7 at the upper side 3 and the planar contact area 16 of the spacers of the upper side 3 of the respective annular disc. The area 8 at the underside 15 of an annular disc 13 may be plane-parallel to the upper side 14 of the respective annular disc, and the area 8 at the upper side 14 of an annular disc 13 may be plane-parallel to the underside 15 of the respective annular disc (see FIG. 5K). The area 8 at the underside 4, 15 of an annular disc 2, 13 or at the upper side 14 of an annular disc 13 may also be inwardly or outwardly sloping.

The central annular region can, and typically does, comprise more than 3 annular discs. The number of annular discs in the central annular region can be from 3 to 500, but also larger numbers of annular discs are possible. For example, the central annular region can comprise 50, 100, 250 or 500 annular discs.

The annular discs 2 and the annular discs 10, 13, respectively, of the central annular region 1, 9 are stacked on top of each other, resulting in a stack of annular discs. The annular discs 2 and the annular discs 10, 13, respectively, are stacked and fixed in such a way that between the individual discs there is in each case a separating gap 6 for the removal of solid particles.

Every upper side 3, 11 of an annular disc 2, 10 which has one or more spacers may be inwardly or outwardly sloping, preferably inwardly sloping, in the regions between the spacers (see FIGS. 3E, 4E, 5E), and every underside 12 of an annular disc 10 which has one or more spacers may be inwardly or outwardly sloping, preferably inwardly sloping, in the regions between the spacers (see FIG. 5E).

If the upper side, or the upper side and underside, respectively, of the annular discs which have one or more spacers, is inwardly or outwardly sloping in the regions between the spacers, in the simplest case, the sectional line on the upper side of the ring cross-section of the annular discs is straight and the ring cross-section of the annular discs in the portions between the spacers is trapezoidal (see FIGS. 3E, 4E, 5E), the thicker side of the ring cross-section having to lie on the respective inlet side of the flow to be filtered. If the flow to be filtered comes from the direction of the outer circumferential surface of the central annular region, the thickest point of the trapezoidal cross-section must lie on the outside and the upper side of the annular discs is inwardly sloping. If the flow to be filtered comes from the direction of the inner circumferential surface of the annular disc, the thickest point of the trapezoidal cross-section must lie on the inside and the upper side of the annular discs is outwardly sloping. The forming of the ring cross-section in a trapezoidal shape, and consequently the forming of a separating gap that diverges in the direction of flow, has the advantage that, after passing the narrowest point of the filter gap, irregularly shaped particles, i.e. non-spherical particles, tend much less to get stuck in the filter gap, for example due to rotation of the particles as a result of the flow in the gap. Consequently, a separating device with a divergent filter gap formed in such a way is less likely to become plugged and clogged than a separating device in which the separating gaps have a filter opening that is constant over the ring cross-section.

The height of the separating gap, i.e. the filter width, may be from 50 to 1000 µm. The height of the separating gap is measured at the position of the smallest distance between two adjacent annular discs.

The tolerance or deviation of the height of the separating gap may be less than +/−62 µm, or +/−50 µm or less, or +/−38 µm or less, or +/−25 µm or less, of the average height of the separating gap. The average height of the separating gap is the mean value of all individual heights of the separating gap when measured between each pair of adjacent annular discs within the stack of annular discs. This measurement is carried out along a line on the lateral surface of the stack of annular discs parallel to the central axis. By a tolerance of +/−50 µm it is meant that an individual height of the separating gap when measured between any pair of adjacent annular discs within the stack of annular discs is at most the average height of the separating gap plus 50 µm and is at least the average height of the separating gap minus 50 µm.

The height of the separating gap may be measured with an optical shaft measuring system, for example with MahrShaft SCOPE 750, available from Mahr GmbH, Göttingen, Germany.

The annular discs 2, 10, 13 may have a height of 1 to 12 mm. More specifically, the height of the annular discs may be from 2 to 7 mm. The height of the annular discs is the thickness of the annular discs in axial direction.

In some embodiments, the annular discs 10 having one or more spacers on the upper side 11 and the underside 12 have a height of 1 to 12 mm, and the annular discs 13 which do not comprise any spacers may have the same height as the annular discs 10 with spacers, or may be thinner than the annular discs 10 with spacers. The annular discs 13 may have a height of 2 to 7 mm, for example. With the reduced height of the annular discs 13 which do not comprise any spacers, the open flow area can be increased.

The base thickness of the annular discs is measured in the region between the spacers and, in the case of a trapezoidal cross-section, on the thicker side in the region between the spacers. The axial thickness or height of the annular discs in the region of the spacers corresponds to the sum of the base thickness and the filter width.

The height of the spacers determines the filter width of the separating device, that is to say the height of the separating gap between the individual annular discs. The filter width additionally determines which particle sizes of the solid particles to be removed, such as for example sand and rock particles, are allowed to pass through by the separating device and which particle sizes are not allowed to pass through. The height of the spacers is specifically set in the production of the annular discs.

For any particular separating device, the annular discs may have uniform base thickness and filter width, or the base thickness and/or filter width may vary along the length of the separating device (e.g., to account for varying pressures, temperatures, geometries, particle sizes, materials, and the like).

The outer contours of the annular discs may be configured with a bevel 25, as illustrated in FIGS. 3D-3F, 4D-4F and 5D-5F. It is also possible to configure the annular discs with rounded edges. This may, for some applications, represent even better protection of the edges (versus straight edged) from the edge loading that is critical for the materials from which the annular discs are produced.

The circumferential surfaces (lateral surfaces) of the annular discs may be cylindrical. However, it is also possible to form the circumferential surfaces as outwardly convex, in order to achieve a better incident flow.

In practice, it is expected that the annular discs are produced with an outer diameter that is adapted to the borehole of the extraction well provided in the application concerned, so that the separating device according to the present disclosure can be introduced into the borehole with little play, in order to make best possible use of the cross-section of the extraction well for achieving a high delivery output. The outer diameter of the annular discs may be 20-250 mm, but outer diameters greater than 250 mm are also possible, as the application demands.

The radial ring width of the annular discs may lie in the range of 8-20 mm. These ring widths are suitable for separating devices with basepipe diameters in the range of 2⅜ to 5½ inches.

As already stated, the spacers arranged on the upper side, or on the upper side and the underside, respectively, of the annular discs have planiform contact with the adjacent annular disc. The spacers make a radial throughflow possible and therefore may be arranged radially aligned on the first major surface of the annular discs. The spacers may, however, also be aligned at an angle to the radial direction.

The spacers arranged on the upper side, or on the upper side and the underside of the annular discs, respectively, may extend over the entire radial width of the annular discs. However, it is also possible that the spacers are aligned in such a way that they do not extend over the entire radial width of the surface of the annular discs, but only take up part of this width. In this case, the spacers preferably take up the part of the width of the annular discs that is located on the filter outlet side of the annular discs, which is generally at the inner circumference of the annular discs. If the spacers only take up part of the width of the annular discs, an increase in the number of spacers does not necessarily mean that there is an associated undesired decrease in the filter inlet area. These spacers are advantageous in that, with virtually the same supporting effect of the spacers, the annular inlet gap of the filter is not reduced by the spacers, or only a little, which leads to the desired greater filter inlet cross-section. The greater the filter inlet cross-section, the greater the volumetric flow that can be filtered. Conversely, when there is a small volumetric flow, the separating device can be made with a smaller configuration, which makes it economically more attractive and is conducive to it being installed in confined spaces.

Figure 3B:
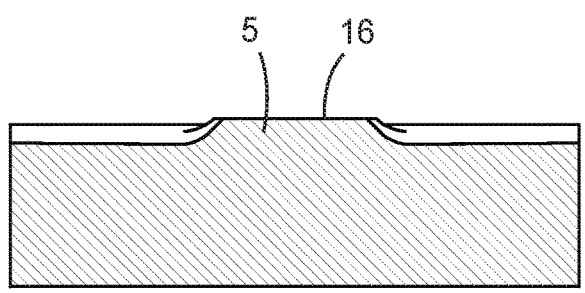
Figure 3G:
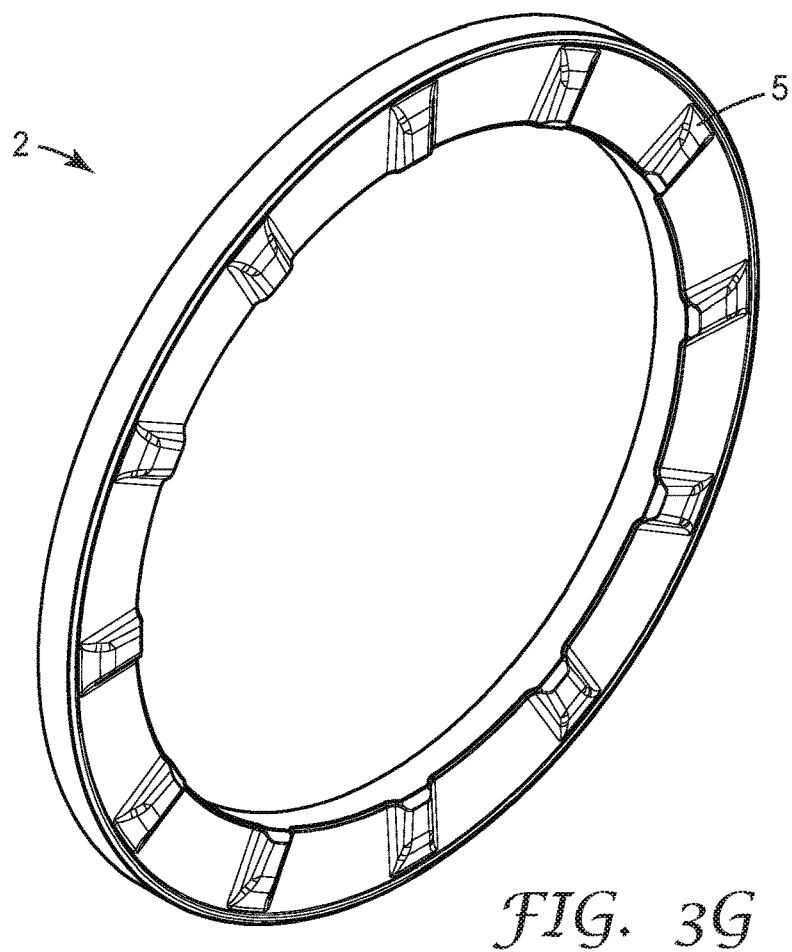
Figure 3H:
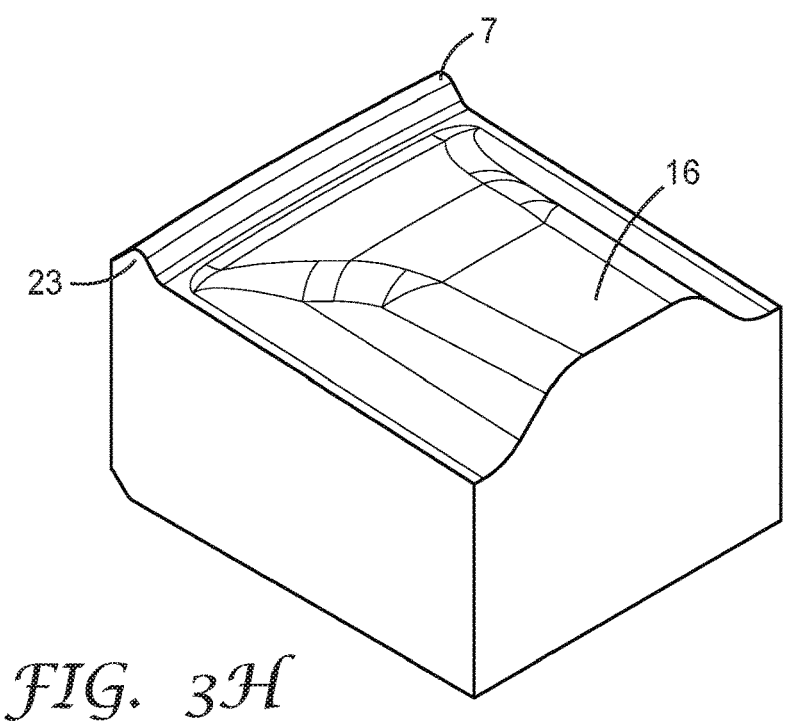

The transitions between the surface of the annular discs, i.e. the upper side, or the upper side and the underside of the annular discs, and the spacers are typically not formed in a step-shaped or sharp-edged manner. Rather, the transitions between the surface of the annular discs and the spacers are typically configured appropriately for the material from which the annular discs are made, i.e. the transitions are made with radii that are gently rounded. This is illustrated in FIGS. 3H, 4H and 5H.

The contact area of the spacers, that is to say the planar area with which the spacers are in contact with the adjacent annular disc are not particularly limited, and may be, for instance, rectangular, round, rhomboidal, elliptical, trapezoidal or else triangular, while the shaping of the corners and edges should always be appropriate for the material from which the annular discs are made, e.g. rounded. Examples of configurations of the spacers with different planar contact areas are shown in FIGS. 3A and 4A.

Depending on the size of the annular discs, the contact area 10 of the individual spacers is typically between 4 and 100 mm$^2$.

The spacers 5 may be distributed over the circumference of the annular discs (see FIGS. 3A, 4A and 5A). The number of spacers may be even or odd. The fluid pressure acting in the filter gap when it is being flowed through also exerts flexural stress on the annular discs. The interspace or span, determining the pressure resistance, is the distance between adjacent spacers. The fewer spacers are arranged on the annular discs, the lower the pressure resistance of the separating device. Although the free filter area decreases undesirably with an increasing number of spacers, in return the pressure resistance of the filter system increases, since the interspace or span decreases. For instance, at least 3 spacers may be provided, or even at least 5, or even at least 10, or further even at least 15. The number of spacers can be selected according to the application concerned or the pressure conditions to be expected, and depending on the mechanical properties of the material that is used for the annular discs. The higher the pressures to be expected during operation, the more spacers should be provided in the structural design. The larger the annular discs, the more spacers should generally be provided in the structural design. Thus, for annular discs with an outside diameter of 100 mm (for a base-pipe outside diameter of 2⅞ inches), for example, 16 spacers may be provided, in the case of an outside diameter of 115 mm (for a base-pipe outside diameter of 3½ inches), for example, 18 spacers may be provided and in the case of an outside diameter of 168 mm (for a base-pipe outside diameter of 5½ inches), for example, 24 spacers may be provided.

The distance between the spacers is measured in the circumferential direction as the distance between the centers of the contact areas of the spacers along the inside diameter. The distance between the spacers may be in the range of 8 to 50 mm, more specifically between 10 and 30, or between 15 and 25 mm. The distance between the spacers has an influence on the resistance to internal and external pressure loading, as can occur in the test for internal and external pressure resistance according to ISO 17824 and also under operating conditions. The smaller the distance between the spacers, the greater the internal and external pressures that the separating device withstands before loss of the filtering effect occurs.

The distance between the spacers can be used to derive the number of spacers for the various sizes of the annular discs. For outside diameters of the annular discs in the range of 80 to 110 mm, from 6 to 35 spacers are typically provided, more specifically from 9 to 28, or even from 11 to 19. For outside diameters of the annular discs in the range of from 110 to 140 mm, from 7 to 42 spacers are provided, more specifically from 11 to 33, or even from 13 to 22. For outside diameters of the annular discs in the range of from 140 to 200 mm, from 10 to 62 spacers are typically provided, more specifically from 16 to 49, or even from 20 to 33.

In some embodiments of the separating device, the annular discs are stacked in such a way that the spacers lie on top of each other. In other embodiments of the separating device, the annular discs are stacked in such a way that the spacers do not lie on top of each other. If only one spacer is provided on the upper side 3 of the annular discs 2, or on the upper side 11 and underside 12 of the annular discs 10, the annular discs are stacked in such a way that the spacers lie on top of each other.

Each annular disc comprises a material independently selected from the group consisting of (i) ceramic materials; (ii) mixed materials having fractions of ceramic or metallic hard materials and a metallic binding phase; and (iii) powder metallurgical materials with hard material phases formed in-situ.

In some embodiments, the annular discs are produced from a material which is independently selected from the group consisting of (i) ceramic materials; (ii) mixed materials having fractions of ceramic or metallic hard materials and a metallic binding phase; and (iii) powder metallurgical materials with hard material phases formed in-situ. These materials are typically chosen based upon their relative abrasion- and erosion-resistance to solid particles such as sands and other mineral particles and also corrosion-resistance to the extraction media and the media used for maintenance, such as for example acids.

The material which the annular discs comprise can be independently selected from this group of materials, which means that each annular disc could be made from a different material. But for simplicity of design and manufacturing, of course, all annular discs of the separating device could be made from the same material.

The ceramic materials which the annular discs can comprise or from which the annular discs are made can be selected from the group consisting of (i) oxidic ceramic materials; (ii) non-oxidic ceramic materials; (iii) mixed ceramics of oxidic and non-oxidic ceramic materials; (iv) ceramic materials having a secondary phase; and (v) long- and/or short fiber-reinforced ceramic materials.

Examples of oxidic ceramic materials are materials chosen from $Al_2O_3$, $ZrO_2$, mullite, spinel and mixed oxides. Examples of non-oxidic ceramic materials are SiC, $B_4C$, $TiB_2$ and $Si_3N_4$. Ceramic hard materials are, for example, carbides and borides. Examples of mixed materials with a metallic binding phase are WC—Co, TiC—Fe and TiB2-FeNiCr. Examples of hard material phases formed in situ are chromium carbides. An example of fiber-reinforced ceramic materials is C/SiC. The material group of fiber-reinforced ceramic materials has the advantage that it leads to still greater internal and external pressure resistance of the separating devices on account of its greater strength in comparison with monolithic ceramic.

The aforementioned materials are distinguished by being harder than the typically occurring hard particles, such as for example sand and rock particles, that is to say the HV (Vickers) or HRC (Rockwell method C) hardness values of these materials lie above the corresponding values of the surrounding rock. Materials suitable for the annular discs of the separating device according to the present disclosure have HV hardness values greater than 11 GPa, or even greater than 20 GPa.

All these materials are at the same time distinguished by having greater brittleness than typical unhardened steel alloys. In this sense, these materials are referred to herein as "brittle-hard".

Materials suitable for the annular discs of the separating device according to the present disclosure have moduli of elasticity greater than 200 GPa, or even greater than 350 GPa.

Materials with a density of at least 90%, more specifically at least 95%, of the theoretical density may be used, in order to achieve the highest possible hardness values and high abrasion and erosion resistances. Sintered silicon carbide (SSiC) or boron carbide may be used as the material for the annular discs. These materials are not only abrasion-resistant but also corrosion-resistant to the treatment fluids usually used for flushing out the separating device and stimulating the borehole, such as acids, for example HCl, bases, for example NaOH, or else steam.

Particularly suitable are, for example, SSiC materials with a fine-grained microstructure (mean grain size ≤5 μm), such as those sold for example under the names 3M™ silicon carbide type F and 3M™ silicon carbide type F plus from 3M Technical Ceramics, Kempten, Germany. Furthermore, however, coarse-grained SSiC materials may also be used, for example with a bimodal microstructure. In one embodiment, 50 to 90% by volume of the grain size distribution consisting of prismatic, platelet-shaped SiC crystallites of a length of from 100 to 1500 μm and 10 to 50% by volume consisting of prismatic, platelet-shaped SiC crystallites of a length of from 5 to less than 100 μm (3M™ silicon carbide type C from 3M Technical Ceramics, Kempten, Germany).

Apart from these single-phase sintered SSiC materials, liquid-phase-sintered silicon carbide (LPS-SiC) can also be used as the material for the annular discs. An example of such a material is 3M™ silicon carbide type T from 3M Technical Ceramics, Kempten, Germany. In the case of LPS-SiC, a mixture of silicon carbide and metal oxides is used as the starting material. LPS-SiC has a higher bending resistance and greater toughness, measured as a KIc value, than single-phase sintered silicon carbide (SSiC).

The annular discs of the separating device disclosed herein may be prepared by the methods that are customary in technical ceramics or powder metallurgy, that is to say by die pressing of pressable starting powders and subsequent sintering. The annular discs may be formed on mechanical or hydraulic presses in accordance with the principles of "near-net shaping", debindered and subsequently sintered to densities >90% of the theoretical density. The annular discs may be subjected to 2-sided facing on their upper side and underside.

The area 7 and the area 8 with a flat surface at the separating gap may be manufactured by machining, for example by grinding or lapping processes.

As already mentioned above, a perforated pipe 17 may be located in the central annular region 1, 9 (see FIGS. 1 and 2). The perforated pipe or basepipe is co-centric with the central annular region.

The basepipe is perforated, i.e. provided with holes, in the region of the central annular region; it is not perforated outside the region of the central annular region. The perforation 22 serves the purpose of directing the filtered fluid, i.e. the fluid flow freed of the solid particles, such as for example gas, oil or mixtures thereof, into the interior of the basepipe, from where it can be transported or pumped away.

Pipes such as those that are used in the oil and gas industry for metallic filters (wire wrap filter, metal mesh screen) may be used as the basepipe. The perforation is provided in accordance with patterns customary in the industry, for example 30 holes with a diameter of 9.52 mm may be introduced over a basepipe length of 0.3048 m (corresponding to 1 foot).

Threads 18 are usually cut at both ends of the basepipe 17 and can be used for screwing the basepipes together into long strings.

The basepipe can consist of a metallic material, a polymer or ceramic material. The basepipe may consist of a metallic material such as steel, for example steel L80. Steel L80 refers to steel that has a yield strength of 80 000 psi (corresponding to about 550 MPa). As an alternative to steel L80, steels that are referred to in the oil and gas industry as J55, N80, C90, T95, P110 and L80Cr13 (see Drilling Data Handbook, 8th Edition, IFP Publications, Editions Technip, Paris, France) may also be used. Other steels, in particular corrosion-resistant alloy and high-alloy steels, may also be used as the material for the basepipe. For special applications in corrosive conditions, basepipes of nickel-based alloys may also be used. It is also possible to use aluminium materials as the material for the basepipe, in order to save weight. Furthermore, basepipes of titanium or titanium alloys may also be used.

The inside diameter of the annular discs must be greater than the outside diameter of the basepipe. This is necessary on account of the differences with regard to the thermal expansion between the metallic basepipe and the material from which the annular discs are made and also for technical reasons relating to flow. It has been found to be favourable in this respect that the inside diameter of the annular discs is at least 0.5 mm and at most 10 mm greater than the outside diameter of the basepipe. In particular embodiments, the inside diameter of the annular discs is at least 1.5 mm and at most 5 mm greater than the outside diameter of the basepipe.

The outside diameter of the basepipe is typically from 1 inch to 10 inches.

The separating device may further comprises two end caps 19, 20 (see FIGS. 1 and 2) at the upper and lower ends of the central annular region 1, 9. The end caps are produced from metal, usually steel and typically from the same material as the basepipe.

The end caps 19, 20 may be firmly connected to the basepipe 17. The end caps may be fastened to the basepipe by means of welding, clamping, riveting or screwing. During assembly, the end caps are pushed onto the basepipe after the central annular region and are subsequently fastened on the basepipe. In the embodiments of the separating device as disclosed herein that is shown in FIGS. 1 and 2, the end caps are fastened by means of welding. If the end caps are fastened by means of clamping connections, friction-increasing structural design measures are preferably taken. Friction-increasing coatings or surface structurings may be used for example as friction-increasing measures. The friction-increasing coating may be configured for example as a chemical-nickel layer with incorporated hard material particles, preferably diamond particles. The layer thickness of the nickel layer is in this case for example 10-25 µm; the average size of the hard particles is for example 20-50 µm. The friction-increasing surface structures may be applied for example as laser structuring.

To protect the brittle-hard annular discs from mechanical damage during handling and fitting into the borehole, the separating device may be surrounded by a tubular shroud 21 (see FIG. 1) that can be freely passed through by a flow. This shroud may be configured for example as a coarse-mesh screen and preferably as a perforated plate. The shroud may be produced from a metallic material, such as from steel, particularly from corrosion-resistant steel. The shroud may be produced from the same material as that used for producing the basepipe.

The shroud can be held on both sides by the end caps; it may also be firmly connected to the end caps. This fixing is possible for example by way of adhesive bonding, screwing or pinning; the shroud may be welded to the end caps after assembly.

The inside diameter of the shroud must be greater than the outside diameter of the annular discs. This is necessary for technical reasons relating to flow. It has been found to be favorable in this respect that the inside diameter of the shroud is at least 0.5 mm and at most 15 mm greater than the outside diameter of the annular discs. The inside diameter of the shroud may be at least 1.5 mm and at most 5 mm greater than the outside diameter of the annular discs.

Figure 3I:
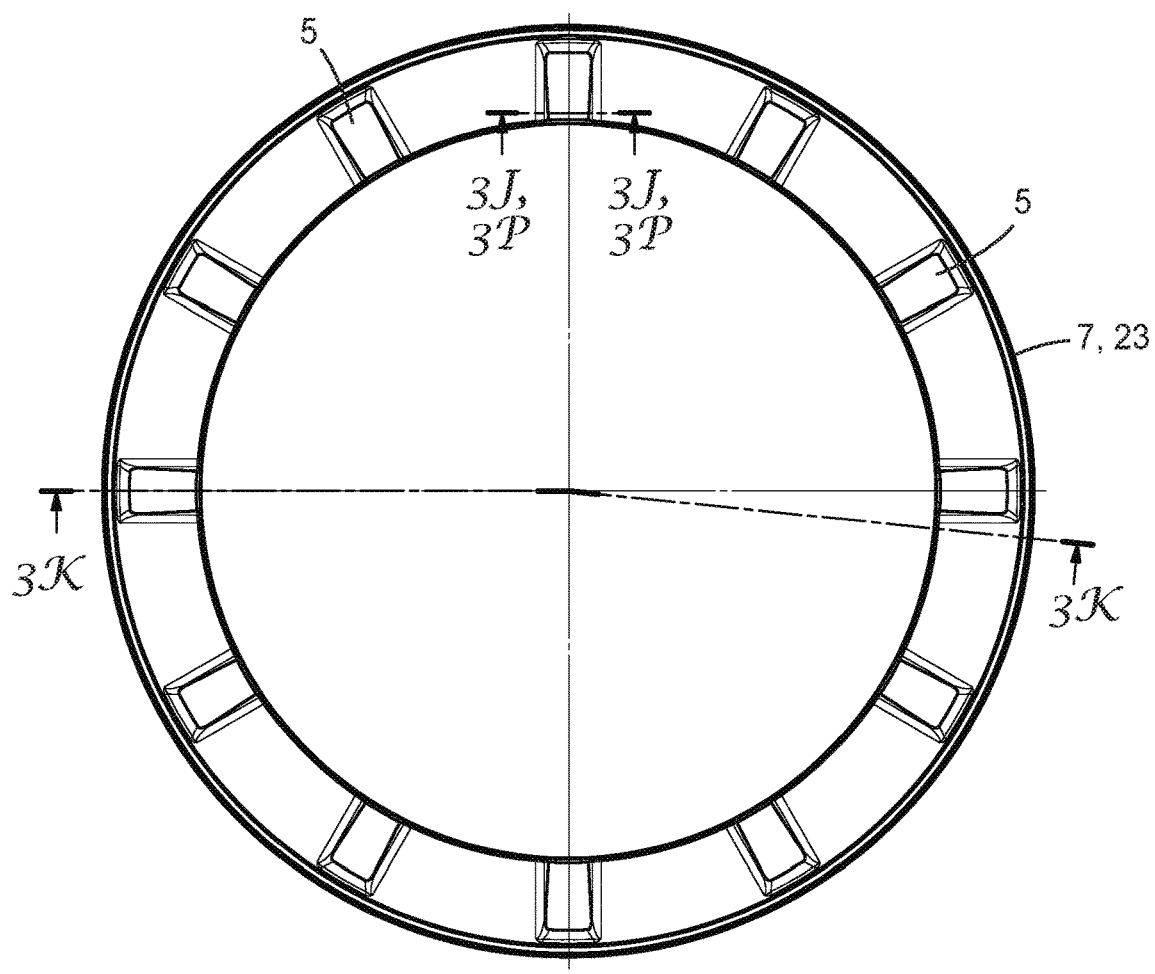
Figure 3J:
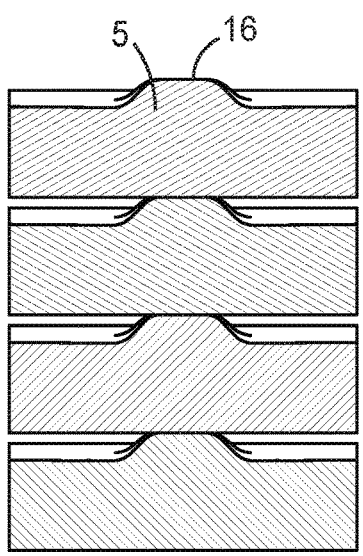
Figure 3O:
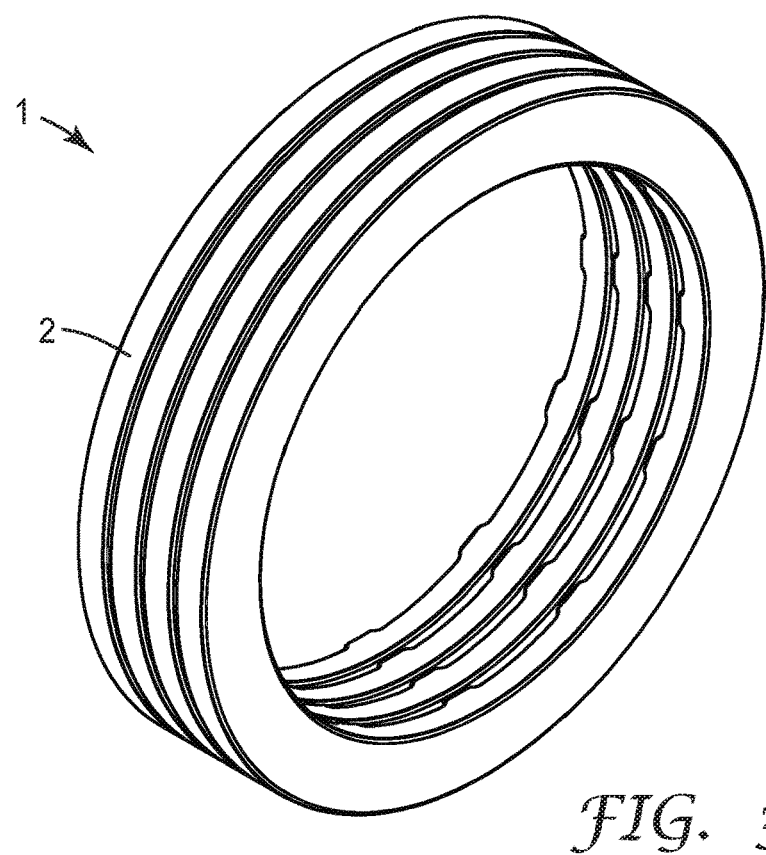
Figure 3P:
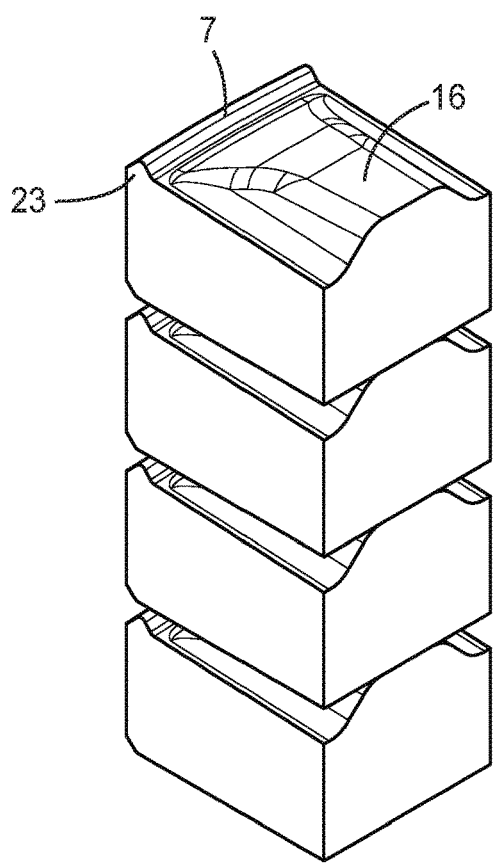

In FIGS. 3A-3P, one embodiment of a central annular region of a separating device as disclosed herein is represented. FIGS. 3A-3H show various details of an individual annular disc 2 of the central annular region 1. FIGS. 3I-3P show the central annular region 1 constructed from annular discs 2 of FIGS. 3A-3H, representing various details of the stack of annular discs. FIG. 3A shows a plan view of the upper side 3 of the annular disc 2, FIG. 3B shows a cross-sectional view along the sectional line denoted in FIG. 3A by "3B, 3H", FIG. 3C shows a cross-sectional view along the sectional line denoted in FIG. 3A by "3C", FIGS. 3D-3F show enlarged details of the cross-sectional view of FIG. 3C. The enlarged detail of FIG. 3D is in the region of a spacer, the enlarged detail of FIG. 3E is in the region between two spacers. FIG. 3G shows a 3D view of the annular disc 2, and FIG. 3H shows a 3D representation along the sectional line denoted in FIG. 3A by "3B, 3H". FIG. 3I shows a plan view of the central annular region 1 constructed from annular discs 2 of FIGS. 3A-3H, FIG. 3J shows a cross-sectional view along the sectional line denoted in FIG. 3I by "3J, 3P", FIG. 3K shows a cross-sectional view along the sectional line denoted in FIG. 3I by "3K", FIGS. 3L-3N show enlarged details of the cross-sectional view of FIG. 3K. The enlarged detail of FIG. 3L is in the region of a spacer, the enlarged detail of FIG. 3M is in the region between two spacers, and FIG. 3N is an enlarged detail of FIG. 3M. FIG. 3O shows a 3D view of the central annular region 1, and FIG. 3P shows a 3D representation along the sectional line denoted in FIG. 3I by "3J, 3P".

The removal of the solid particles takes place at the inlet opening of a separating gap 6, which may be divergent, i.e. opening, in the direction of flow (see FIGS. 3E and 3M) and is formed between two annular discs lying one over the other. The annular discs are designed appropriately for the materials from which the annular discs are produced and the operational environment intended for the devices made with such annular discs, e.g., materials may be chosen for given pressure, temperature and corrosive operating conditions, and so that cross-sectional transitions may be configured without notches so that the occurrence of flexural stresses is largely avoided by the structural design.

The upper side 3 of each annular disc 2 has twelve spacers 5 distributed over its circumference. The underside 4 does not comprise any spacers. The spacers 5 are of a defined height, with the aid of which the height of the separating gap 6 (gap width of the filter gap, filter width) is set. The spacers are not separately applied or subsequently welded-on spacers, they are formed directly in production, during the shaping of the annular discs.

The contact area 16 of the spacers 5 is planar (see FIGS. 3D, 3H), so that the spacers 5 have a planar contact area with the underside 4 of the adjacent annular disc. The upper side 3 of the annular discs is plane-parallel with the underside 4 of the annular discs in the region of the contact area 16 of the spacers 5, i.e. in the region of contact with the adjacent annular disc. The underside 4 of the annular discs is formed as smooth and planar and at right angles to the disc axis and the central axis of the central annular region. At the planar contact area of the spacers, the annular discs contact the respective adjacent annular disc.

The upper side 3 of an annular disc 2 having twelve spacers 5 is inwardly sloping, in the regions between the spacers. The ring cross-section of the annular discs in the portions between the spacers is trapezoidal (see FIG. 3E), the thicker side of the ring cross-section lying on the outside, i.e. on the inlet side of the flow to be filtered.

The upper side 3 of each annular disc 2 has an elevation 23 at the separating gap 6 (see FIGS. 3F, 3H, 3L-3N). The elevation 23 is along the circumference of the annular disc 2. The elevation 23 may have a rounded surface on the upper side 3 of the annular disc 2, for example a slightly convex surface. Preferably, the elevation 23 comprises an area 7 having a flat surface (see FIGS. 3F, 3H). The area 7 having a flat surface on the elevation 23 on the upper side 3 of the annular disc 2 may be plane-parallel to the underside of the annular disc 2, as shown in FIGS. 3D, 3E. It is also possible that the area 7 is inwardly or outwardly sloping.

The area 7 at the separating gap may have a surface flatness of 80 µm or less, or 50 µm or less, or 20 µm or less. The underside 4 of each annular disc 2 may have a surface flatness of 20 µm or less. The planar contact areas 16 of the spacers 5 of the upper side 3 of the annular discs 2 may have a surface flatness of 20 µm or less.

Flatness measurements may be performed interferometric, for example with a Tropel FM200XR, available from Corning Tropel Corporation, Fairport, New York, USA, or with a coordinate measuring machine.

If the area 7 with a flat surface at the separating gap of the upper side 3 is plane-parallel to the underside 4 of the annular disc 2, the area 7 and the underside 4 of the annular disc 2 may have a plane-parallelism of 20 µm or less to each other. The planar contact areas 16 of the spacers 5 of the upper side 3 of each annular disc 2 may have a plane-parallelism of 20 µm or less to the underside 4 of the annular disc 2.

Measurement of plane-parallelism may be performed with a coordinate measuring machine.

The area 7 is not in the same plane as the contact area 16 of the spacers 5, as shown in FIG. 3D, which means that the height of the annular disc 2 at the position of the elevation 23 is lower than the height of the annular disc 2 at the position of the spacers 5.

The position of the elevation 23 at the outer circumference of the annular disc 2 is the position with the closest distance of two adjacent annular discs at the separating gap 6 which distance defines the height of the separating gap or filter width of the separating device (see also FIGS. 3L-3N).

The area 7 with a flat surface at the separating gap on the upper side 3 of each annular disc 2 may be manufactured by machining, for example by grinding or lapping processes. The underside 4 of each annular disc 2 may be manufactured by machining, for example by grinding or lapping processes. The planar contact area 16 of the spacers 5 may also be machined by grinding or lapping processes. Other methods for machining that can be used for machining of the area 7, the planar contact area 16 and the underside 3 of the annular discs 2 are laser ablation and eroding. If non-oxidic ceramic materials such as sintered silicon carbide are used to manufacture the annular discs, preferred machining processes are grinding or lapping processes.

Figure 4I:
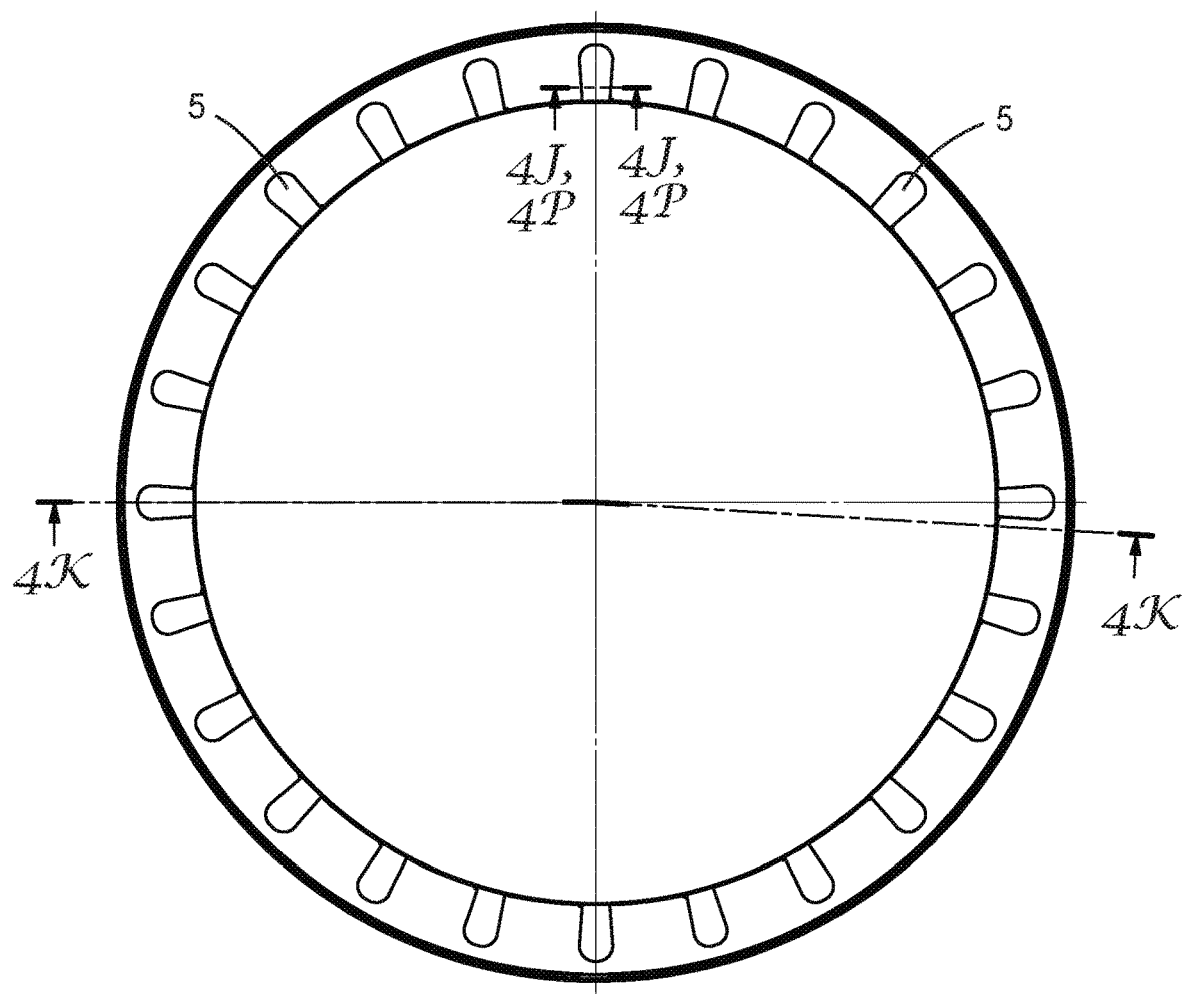
Figure 4J:
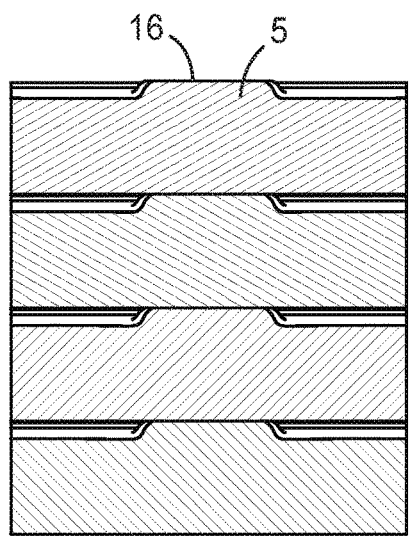
Figure 4L:
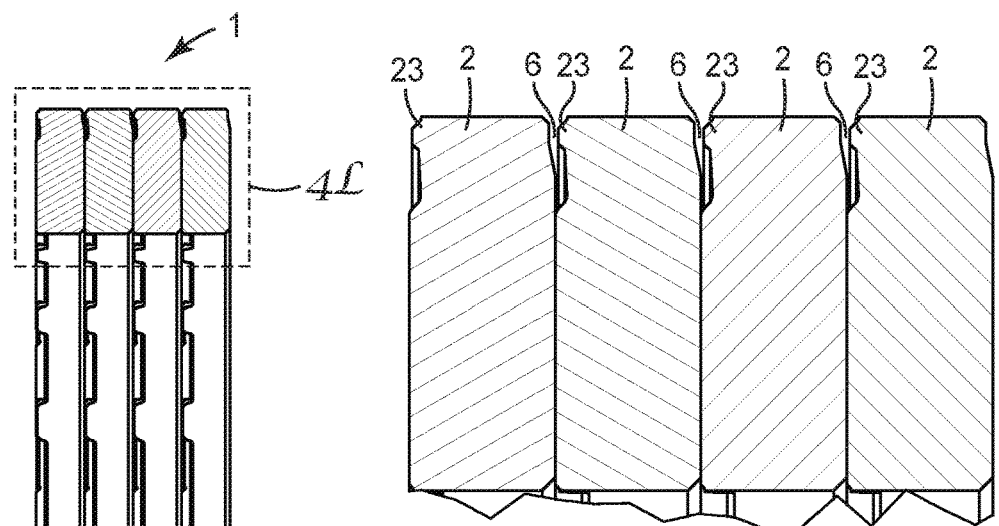
Figure 4M:
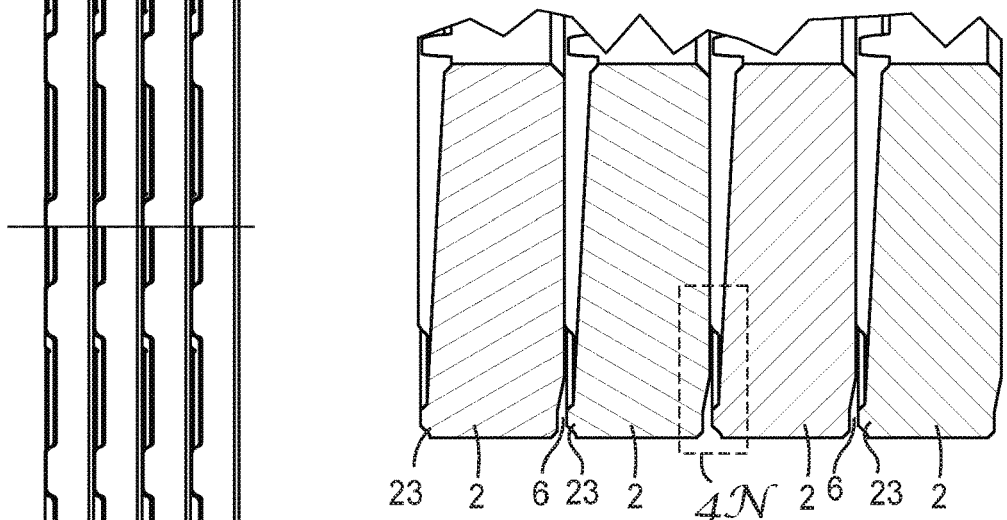
Figure 4K:
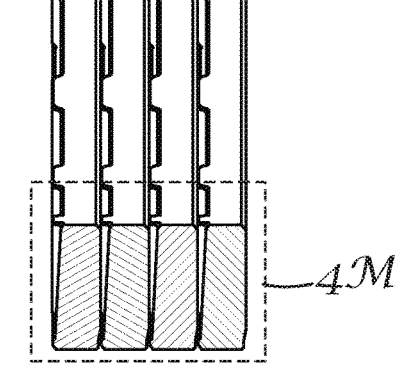
Figure 4N:
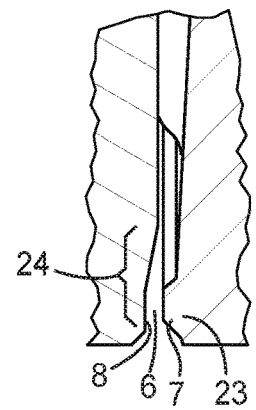
Figure 4O:
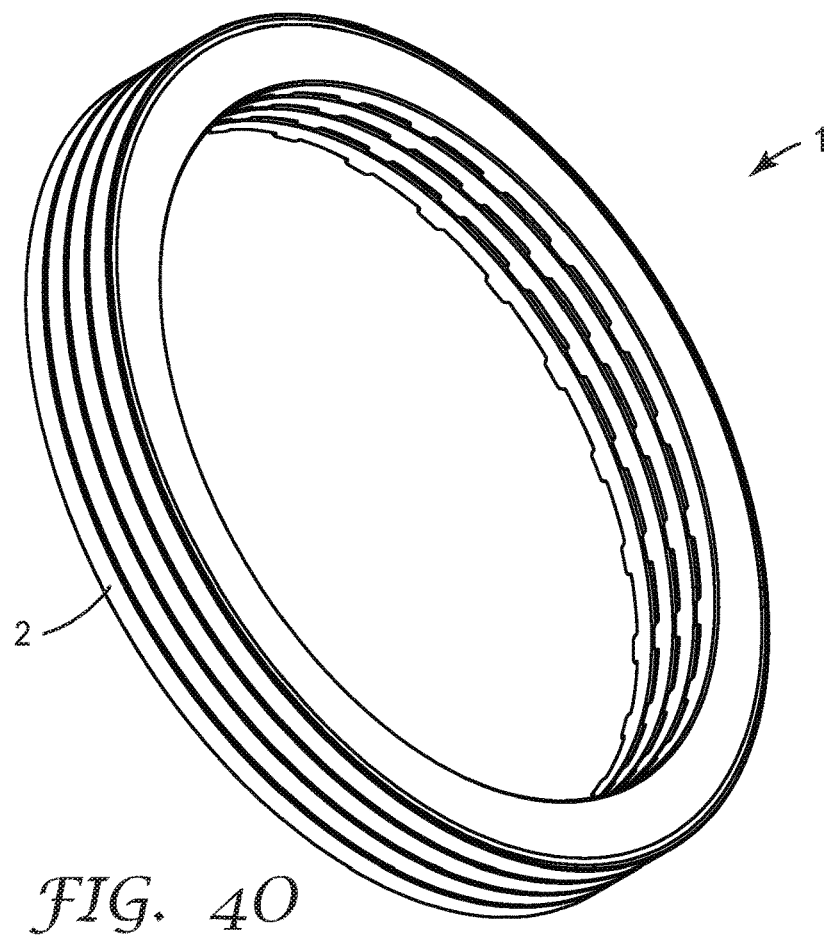
Figure 4P:
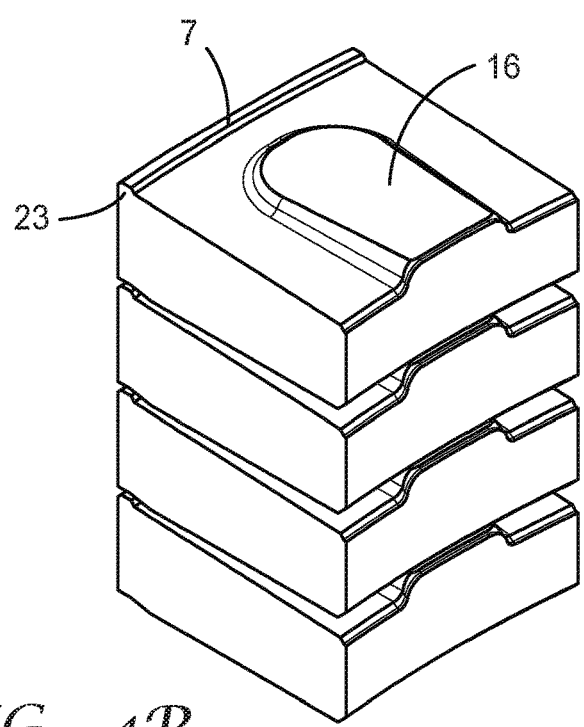

In FIGS. 4A-4P, a further embodiment of a central annular region of a separating device as disclosed herein is represented. FIGS. 4A-4H show various details of an individual annular disc 2 of the central annular region 1. FIGS. 4I-4P show the central annular region 1 constructed from annular discs 2 of FIGS. 4A-4H, representing various details of the stack of annular discs. FIG. 4A shows a plan view of the upper side 3 of the annular disc 2, FIG. 4B shows a cross-sectional view along the sectional line denoted in FIG. 4A by "4B, 4H", FIG. 4C shows a cross-sectional view along the sectional line denoted in FIG. 4A by "4C", FIGS. 4D-4F show enlarged details of the cross-sectional view of FIG. 4C. The enlarged detail of FIG. 4D is in the region of a spacer, the enlarged detail of FIG. 4E is in the region between two spacers. FIG. 4G shows a 3D view of the annular disc 2, and FIG. 4H shows a 3D representation along the sectional line denoted in FIG. 4A by "4B, 4H". FIG. 4I shows a plan view of the central annular region 1 constructed from annular discs 2 of FIGS. 4A-4H, FIG. 4J shows a cross-sectional view along the sectional line denoted in FIG. 4I by "4J, 4P", FIG. 4K shows a cross-sectional view along the sectional line denoted in FIG. 4I by "4K", FIGS. 4L-4N show enlarged details of the cross-sectional view of FIG. 4K. The enlarged detail of FIG. 4L is in the region of a spacer, the enlarged detail of FIG. 4M is in the region between two spacers, and FIG. 4N is an enlarged detail of FIG. 4M representing the inflow region of the separating gap. FIG. 4O shows a 3D view of the central annular region 1, and FIG. 4P shows a 3D representation along the sectional line denoted in FIG. 4I by "4J, 4P".

The removal of the solid particles takes place at the inlet opening of a separating gap 6, which may be divergent, i.e. opening, in the direction of flow (see FIGS. 4E and 4M) and is formed between two annular discs lying one over the other. The annular discs are designed appropriately for the materials from which the annular discs are produced and the operational environment intended for the devices made with such annular discs, e.g., materials may be chosen for given pressure, temperature and corrosive operating conditions, and so that cross-sectional transitions may be configured without notches so that the occurrence of flexural stresses is largely avoided by the structural design.

The upper side 3 of each annular disc 2 has twenty-four spacers 5 distributed over its circumference. The underside 4 does not comprise any spacers. The spacers 5 are of a defined height, with the aid of which the height of the separating gap 6 (gap width of the filter gap, filter width) is set. The spacers are not separately applied or subsequently welded-on spacers, they are formed directly in production, during the shaping of the annular discs.

The contact area 16 of the spacers 5 is planar (see FIGS. 4D, 4H), so that the spacers 5 have a planar contact area with the underside 4 of the adjacent annular disc. The upper side 3 of the annular discs is plane-parallel with the underside 4 of the annular discs in the region of the contact area 16 of the spacers 5, i.e. in the region of contact with the adjacent annular disc. The underside 4 of the annular discs is formed as smooth and planar and at right angles to the disc axis and the central axis of the central annular region. At the planar contact area of the spacers, the annular discs contact the respective adjacent annular disc.

The upper side 3 of an annular disc 2 having twenty-four spacers 5 is inwardly sloping, in the regions between the spacers. The ring cross-section of the annular discs in the portions between the spacers is trapezoidal (see FIG. 4E), the thicker side of the ring cross-section lying on the outside, i.e. on the inlet side of the flow to be filtered.

The upper side 3 of each annular disc 2 has an elevation 23 at the separating gap 6 (see FIGS. 4F, 4H, 4L-4N). The elevation 23 is along the circumference of the annular disc 2. The elevation 23 may have a rounded surface on the upper side 3 of the annular disc 2, for example a slightly convex surface. Preferably, the elevation 23 comprises an area 7 having a flat surface (see FIGS. 4F, 4H). The area 7 having a flat surface on the elevation 23 on the upper side 3 of the annular disc 2 may be plane-parallel to the underside 4 of the annular disc 2. It is also possible that the area 7 is inwardly or outwardly sloping.

The area 7 at the separating gap may have a surface flatness of 80 µm or less, or 50 µm or less, or 20 µm or less. The underside 4 of each annular disc 2 may have a surface flatness of 20 µm or less. The planar contact areas 16 of the spacers 5 of the upper side 3 of the annular discs 2 may have a surface flatness of 20 µm or less.

Flatness measurements may be performed interferometric, for example with a Tropel FM200XR, or with a coordinate measuring machine.

If the area 7 with a flat surface at the separating gap of the upper side 3 is plane-parallel to the underside 4 of the annular disc 2, the area 7 and the underside 4 of the annular disc 2 may have a plane-parallelism of 20 µm or less to each other. The planar contact areas 16 of the spacers 5 of the upper side 3 of each annular disc 2 may have a plane-parallelism of 20 µm or less to the underside 4 of the annular disc 2.

Measurement of plane-parallelism may be performed with a coordinate measuring machine.

The area 7 may be in the same plane as the contact area 16 of the spacers 5, which means that the height of the annular disc 2 at the position of the elevation 23 is the same as the height of the annular disc 2 at the position of the spacers 5. The area 7 may also not be in the same plane as the contact area 16 of the spacers 5, as shown in FIG. 4D, which means that the height of the annular disc 2 at the position of the elevation 23 is lower than the height of the annular disc 2 at the position of the spacers 5.

The position of the elevation 23 at the outer circumference of the annular disc 2 is the position with the closest distance of two adjacent annular discs at the separating gap 6 which distance defines the height of the separating gap or filter width of the separating device (see also FIGS. 4L-4N).

The underside 4 of each annular disc 2 has a recess 24 at the separating gap 6 (see FIGS. 4D, 4E, 4L-4N). The recess 24 is along the circumference of the annular disc 2. The recess 24 may have a rounded surface on the underside 4 of the annular disc 2, for example a slightly convex surface. Preferably, the recess 24 comprises an area 8 having a flat surface (see FIGS. 4D, 4E). The area 8 having a flat surface on the recess 24 at the underside 4 of the annular disc 2 may be plane-parallel to the upper side 3 of the annular disc 2, which means plane-parallel to the area 7 at the upper side 3 and the planar contact area 16 of the spacers of the upper side 3 of the respective annular disc. It is also possible that the area 8 is inwardly or outwardly sloping.

The area 8 at the separating gap may have a surface flatness of 80 µm or less, or 50 µm or less, or 20 µm or less.

Flatness measurements may be performed with a coordinate measuring machine.

If the area 8 with a flat surface at the separating gap at the underside 4 of the annular disc 2 is plane-parallel to the upper side 3 of the annular disc 2, the area 8 and the upper side 3 of the annular disc 2 may have a plane-parallelism of 20 µm or less to each other.

Measurement of plane-parallelism may be performed with a coordinate measuring machine.

The breadth of the recess 24 in radial direction is larger than the breadth of the elevation 23 in radial direction.

The area 7 with a flat surface at the separating gap on the upper side 3 of each annular disc 2 may be manufactured by machining, for example by grinding or lapping processes. The area 8 with a flat surface at the separating gap on the underside 4 of each annular disc 2 may be manufactured by machining, for example by grinding or lapping processes. The underside 4 of each annular disc 2 may be manufactured by machining, for example by grinding or lapping processes. The planar contact area 16 of the spacers 5 may also be machined by grinding or lapping processes. Other methods for machining that can be used for machining of the area 7, the area 8, the planar contact area 16 and the underside 3 of the annular discs 2 are laser ablation and eroding. If non-oxidic ceramic materials such as sintered silicon carbide are used to manufacture the annular discs, preferred machining processes are grinding or lapping processes.

If the area 7 is in the same plane as the contact area 16 of the spacers 5, the machining of the area 7 can be performed in one step by two-sided facing of the upper side 3 and underside 4 of the annular disc 2, for example by grinding or lapping processes, and no separate machining process for the area 7 is necessary. The area 7 can be in the same plane as the contact area 16 of the spacers 5, as on the opposite surface of the area 7 at the separating gap there is provided the recess 24.

Figure 5N:
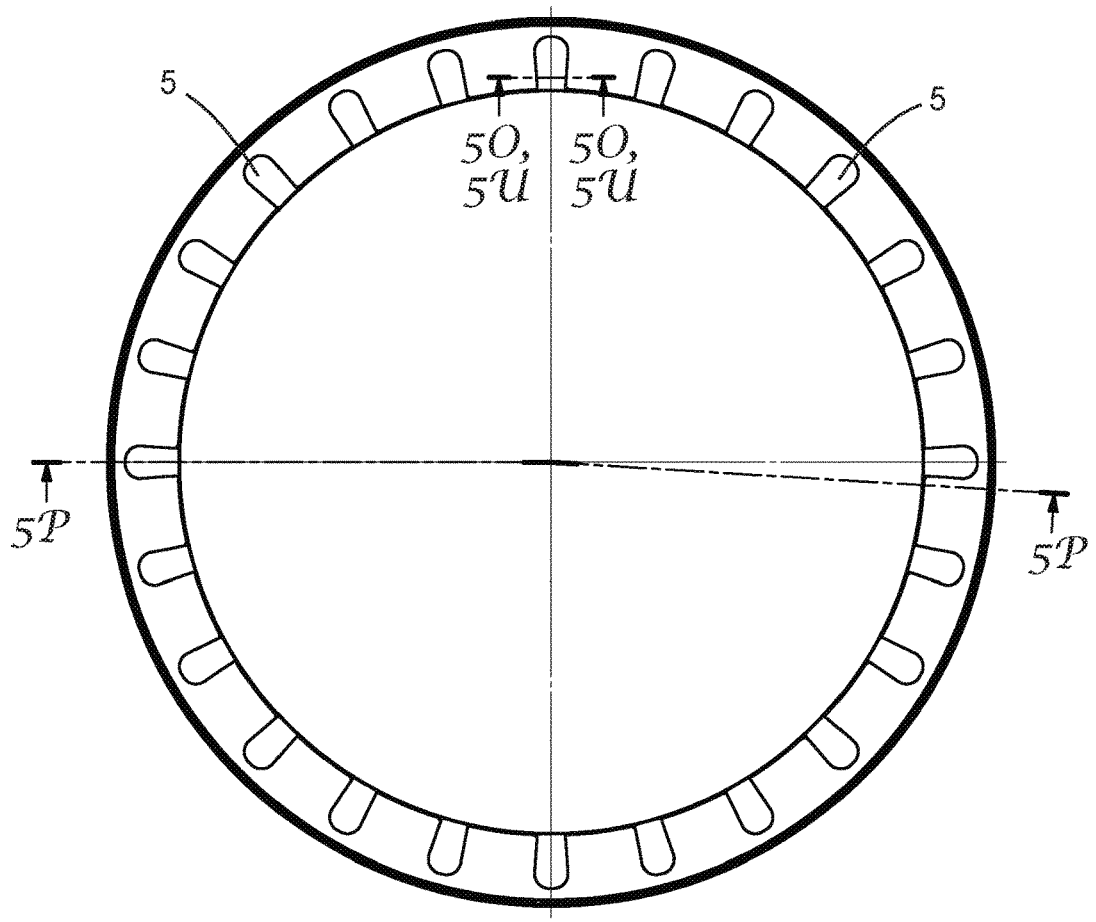
Figure 5O:
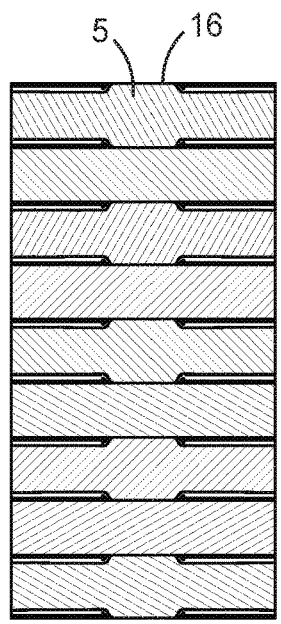
Figure 5P:
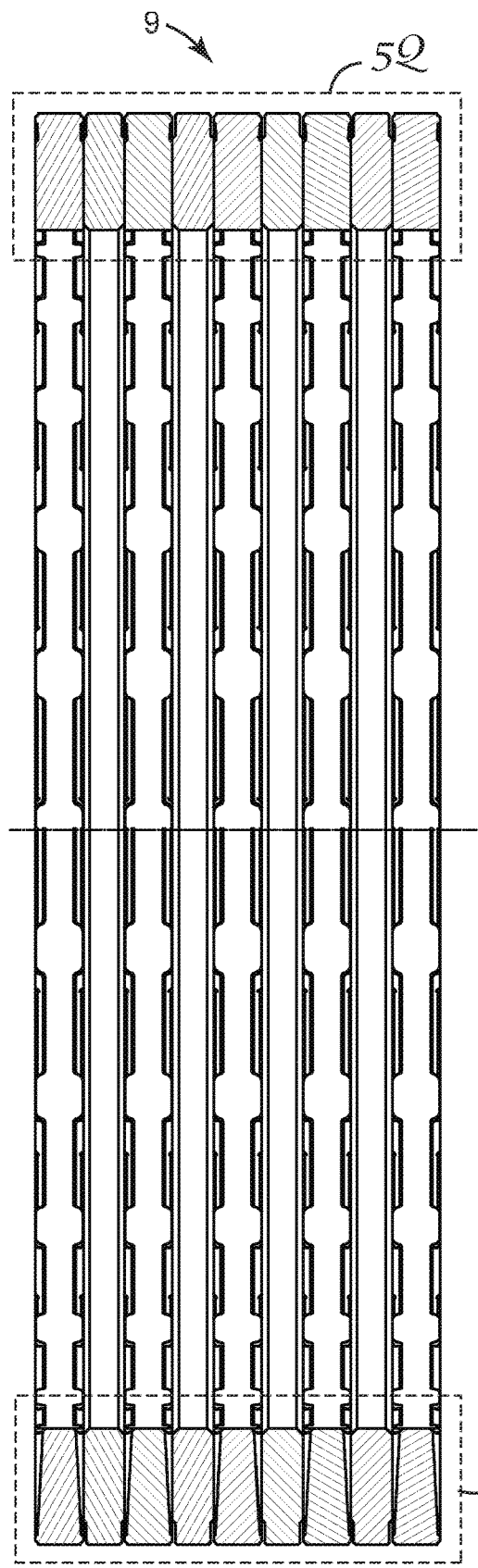
Figure 5Q:
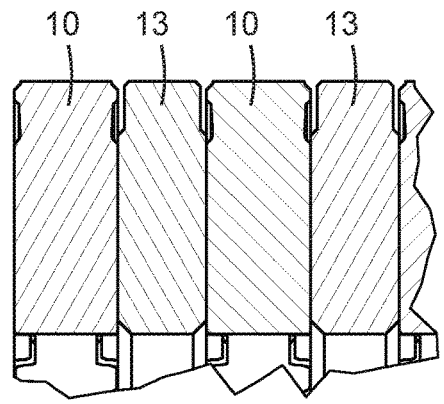
Figure 5R:
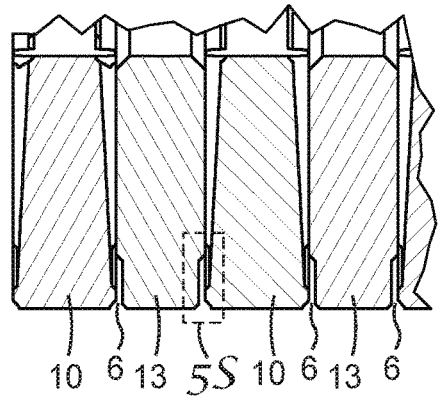
Figure 5S:
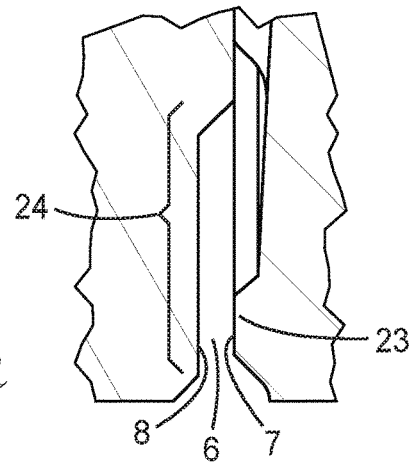
Figure 5T:
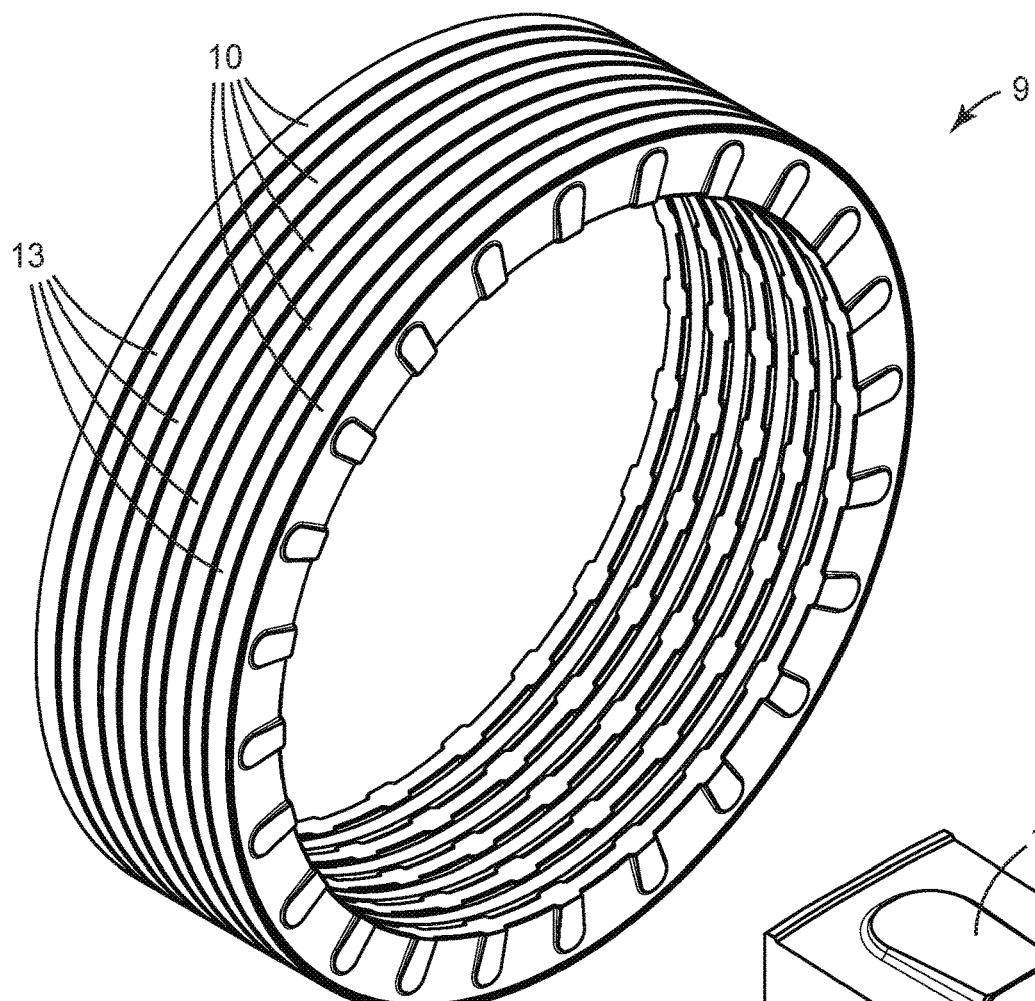
Figure 5U:
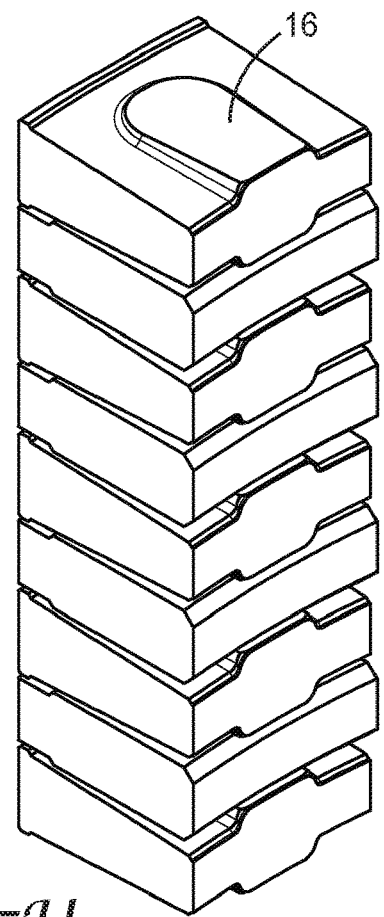

In FIGS. 5A-5U, a further embodiment of a central annular region of a separating device as disclosed herein is represented. FIGS. 5A-5M show various details of individual annular discs 10 and 13 of the central annular region 9. FIGS. 5N-5U show the central annular region 9 constructed from annular discs 10 and 13 of FIGS. 5A-5M, representing various details of the stack of annular discs. FIG. 5A shows a plan view of the upper side 11 and of the underside 12 of the annular disc 10, FIG. 5B shows a cross-sectional view along the sectional line denoted in FIG. 5A by "5B, 5H", FIG. 5C shows a cross-sectional view along the sectional line denoted in FIG. 5A by "5C", FIGS. 5D-5F show enlarged details of the cross-sectional view of FIG. 5C. The enlarged detail of FIG. 5D is in the region of the spacers, the enlarged detail of FIG. 5E is in the region between the spacers. FIG. 5G shows a 3D view of the annular disc 10, and FIG. 5H shows a 3D representation along the sectional line denoted in FIG. 5A by "5B, 5H". FIG. 5I shows a plan view of the upper side 14 and the underside 15 of the annular disc 13, FIG. 5J shows a cross-sectional view of the annular disc 13, FIG. 5K shows an enlarged detail of FIG. 5J, FIG. 5L shows a 3D view of the annular disc 13, and FIG. 5M shows a 3D representation along the sectional line denoted in FIG. 5I by "5M". FIG. 5N shows a plan view of the central annular region 9 constructed from annular discs 10 and 13 of FIGS. 5A-5M, FIG. 5O shows a cross-sectional view along the sectional line denoted in FIG. 5N by "5O, 5U", FIG. 5P shows a cross-sectional view along the sectional line denoted in FIG. 5N by "5P", FIGS. 5Q-5S show enlarged details of the cross-sectional view of FIG. 5P. The enlarged detail of FIG. 5Q is in the region of a spacer, the enlarged detail of FIG. 5R is in the region between the spacers, FIG. 5S shows an enlarged detail of FIG. 5R. FIG. 5T shows a 3D view of the central annular region 9, and FIG. 5U shows a 3D representation along the sectional line denoted in FIG. 5N by "5O, 5U".

The stack of annular discs 9 is composed of annular discs 10 and 13 which are stacked in an alternating manner. Every second annular disc in the stack is an annular disc 10 having twenty-four spacers 5 on the upper side 11 of the annular disc 10 distributed over its circumference (see FIG. 5A) and twenty-four spacers 5 on the underside 12 of the annular disc distributed over its circumference. The plan view of the upper side 11 of FIG. 5A is identical to the plan view of the underside 12. The spacers 5 on the upper side 11 of the annular disc 10 may be positioned mirror-symmetrically to the spacers 5 on the underside 12 of the annular disc 10 as shown in FIG. 5B, but it is also possible that the spacers on the upper side 11 are at positions different from the spacers of the underside 12. The spacers 5 of the annular discs 10 are of a defined height, with the aid of which the height of the separating gap 6 (gap width of the filter gap, filter width) is set. The spacers are not separately applied or subsequently welded-on spacers, they are formed directly in production, during the shaping of the annular discs.

The respectively adjacent annular discs of the annular discs 10 in the stack of annular discs 9 are annular discs 13 as shown in FIGS. 5I-5M. The upper side 14 and the underside 15 of the annular discs 13 do not comprise any spacers.

The removal of the solid particles takes place at the inlet opening of a separating gap 6, which may be divergent, i.e. opening, in the direction of flow (see FIGS. 5E and 5R) and is formed between two adjacent annular discs lying one over the other. The annular discs are designed appropriately for the materials from which the annular discs are produced and the operational environment intended for the devices made with such annular discs, e.g., materials may be chosen for given pressure, temperature and corrosive operating conditions, and so that cross-sectional transitions may be configured without notches so that the occurrence of flexural stresses is largely avoided by the structural design.

The contact area 16 of the spacers 5 is planar (see FIGS. 5D, 5H), so that the spacers 5 have a planar contact area with the underside 15 or upper side 14 of the adjacent annular disc 13. The upper side 11 of the annular discs 10 is plane-parallel with the underside 12 of the annular discs 10 in the region of the contact area 16 of the spacers 5, i.e. in the region of contact with the adjacent annular disc. At the planar contact area of the spacers, the annular discs contact the respective adjacent annular disc 13.

The upper side 14 and the underside 15 of the annular discs 13 is formed as smooth and planar and at right angles to the disc axis and the central axis of the central annular region.

The upper side 11 and the underside 12 of an annular disc 10 having twenty-four spacers 5 is inwardly sloping, in the regions between the spacers 5. The ring cross-section of the annular discs in the portions between the spacers is trapezoidal (see FIG. 5E), the thicker side of the ring cross-section lying on the outside, i.e. on the inlet side of the flow to be filtered.

The upper side 11 and the underside 12 of each annular disc 10 each have an elevation 23 at the separating gap 6 (see FIGS. 5F, 5H, 5Q-5S). The elevation 23 is along the circumference of the annular disc 2. The elevation 23 may have a rounded surface on the upper side 3 of the annular disc 2, for example a slightly convex surface. Preferably, the elevation 23 comprises an area 7 having a flat surface (see FIGS. 5F, 5H). The area 7 having a flat surface on the elevation 23 on the upper side 11 of the annular disc 10 may be plane-parallel to the underside 12 of the annular disc 10, which means plane-parallel to the area 7 on the underside 12 and to the planar contact area 16 of the spacers of the underside 12 of the annular disc 10. It is also possible that the area 7 is inwardly or outwardly sloping.

The area 7 at the separating gap may have a surface flatness of 80 µm or less, or 50 µm or less, or 20 µm or less. The planar contact areas 16 of the spacers 5 of the upper side 11 and of the underside 12 of the annular discs 10 may have a surface flatness of 20 µm or less.

Flatness measurements may be performed interferometric, for example with a Tropel FM200XR, or with a coordinate measuring machine.

If the area 7 having a flat surface at the separating gap on the upper side 11 is plane-parallel to the underside 12 of the annular disc 10, the area 7 on the upper side 11 and the underside 12 of the annular disc 10 may have a plane-parallelism of 20 µm or less to each other. The planar contact areas 16 of the spacers 5 of the upper side 11 of each annular disc 10 may have a plane-parallelism of 20 µm or less to the planar contact areas 16 of the spacers 5 of the underside 4 of the annular disc 10.

Measurement of plane-parallelism may be performed with a coordinate measuring machine.

The area 7 may be in the same plane as the contact area 16 of the spacers 5, which means that the height of the annular disc 10 at the position of the elevations 23 is the same as the height of the annular disc 10 at the position of the spacers 5, as shown in FIG. 5D. The area 7 may also not be in the same plane as the contact area 16 of the spacers 5, which means that the height of the annular disc 10 at the position of the elevations 23 is lower than the height of the annular disc 10 at the position of the spacers 5.

The position of the elevations 23 at the outer circumference of the annular disc 10, at the upper side 11 and at the underside 12, is the position with the closest distance of two adjacent annular discs 10, 13 at the separating gap 6 which distance defines the height of the separating gap or filter width of the separating device (see also FIGS. 5Q-5S).

The upper side 14 and the underside 15 of the annular disc 13 each have a recess 24 at the separating gap 6 (see FIGS. 5K, 5M, 5S). The recess 24 is along the circumference of the annular disc 10. The recess 24 may have a rounded surface, for example a slightly convex surface, on the upper side 14 and underside 15 of the annular disc 10. Preferably, the recess 24 comprises an area 8 having a flat surface (see FIGS. 5K, 5M). The area 8 having a flat surface on the recess 24 at the upper side 14 of the annular disc 13 may be plane-parallel to the area 8 having a flat surface on the recess 24 at the underside 15 of the annular disc 13. It is also possible that the area 8 is inwardly or outwardly sloping.

The area 8 at the separating gap may have a surface flatness of 80 µm or less, or 50 µm or less, or 20 µm or less.

Flatness measurements may be performed with a coordinate measuring machine.

If the area 8 with a flat surface at the separating gap at the upper side 14 of the annular disc 13 is plane-parallel to the area 8 with a flat surface at the separating gap at the underside 15 of the annular disc 13, the area 8 at the upper side 14 and the area 8 at the underside 15 of the annular disc 13 may have a plane-parallelism of 20 µm or less to each other.

Measurement of plane-parallelism may be performed with a coordinate measuring machine.

The breadth of the recess 24 in radial direction is larger than the breadth of the elevation 23 in radial direction (see FIG. 5S).

The area 7 with a flat surface at the separating gap on the upper side 11 and on the underside 12 of every annular disc 10 may be manufactured by machining, for example by grinding or lapping processes. The area 8 with a flat surface at the separating gap on the upper side 14 and the underside 15 of every annular disc 13 may be manufactured by machining, for example by grinding or lapping processes. The upper side 14 and the underside 15 of every annular disc 13 may be manufactured by machining, for example by grinding or lapping processes. The planar contact area 16 of the spacers 5 may also be machined by grinding or lapping processes. Other methods for machining that can be used for machining of the area 7, the area 8, the planar contact area 16 and the upper side 14 and the underside 15 of the annular discs 13 are laser ablation and eroding. If non-oxidic ceramic materials such as sintered silicon carbide are used to manufacture the annular discs, preferred machining processes are grinding or lapping processes.

If the area 7 is in the same plane as the contact area 16 of the spacers 5, the machining of the area 7 can be performed in one step by two-sided facing of the upper side 3 and underside 4 of the annular disc 2, for example by grinding or lapping processes, and no separate machining process for the area 7 is necessary. The area 7 can be in the same plane as the contact area 16 of the spacers 5, as on the opposite surface of the area 7 at the separating gap there is provided the recess 24.

The separating device according to the present disclosure may be used for removing solid particles from a fluid. A fluid as used herein means a liquid or a gas or combinations of liquids and gases.

The separating device according to the present disclosure may be used in extraction wells in oil and/or gas reservoirs for separating solid particles from volumetric flows of mineral oil and/or natural gas. The separating device may also be used for other filtering processes for removing solid particles from fluids outside of extraction wells, processes in which a great abrasion resistance and a long lifetime of the separating device are required, such as for example for filtering processes in mobile and stationary storage installations for fluids or for filtering processes in naturally occurring bodies of water, such as for instance in the filtering of seawater. The separating device disclosed herein can also be used in a process for extracting ores and minerals. In the extraction of ore and many other minerals, there are problems of abrasion and erosion in the removal of solid particles from fluid flows. The separating device according to the present disclosure is particularly suitable for the separation of solid particles from fluids, in particular from mineral oil, natural gas and water, in extraction wells in which high and extremely high rates of flow and delivery volumes occur.

The invention claimed is:

1. A separating device for removing solid particles from fluids, comprising:

a stack of at least three annular discs defining a central annular region along a central axis, each annular disc having an upper side and an underside, wherein the upper side of each annular disc has two or more spacers distributed over the circumference of the upper side of the annular disc such that adjacent spacers are separated by an interspace corresponding to the distance between the adjacent spacers, and wherein the spacers of the upper side of each annular disc contact the underside of the adjacent annular disc, and wherein the annular discs are stacked in such a way that a separating gap for the removal of solid particles is present in each case between adjacent annular discs, and wherein each of the one or more spacers have a planar contact area of between 4 and 100 mm$^2$ with the adjacent annular disc, and wherein each annular disc has an elevation projecting from the upper side of the annular disc continuously extending along the entire outer circumference of the annular disc at the separating gap.

2. The separating device according to claim 1, wherein the underside of each annular disc is formed at right angles to the central axis.

3. The separating device according to claim 1, wherein the underside of each annular disc has a recess at the separating gap.

4. The separating device according to claim 1, wherein the elevation comprises an area having a flat surface.

5. The separating device according to claim 1, wherein every upper side of an annular disc which has one or more spacers is inwardly sloping, in the regions between the spacers, and wherein every underside of an annular disc which has one or more spacers is inwardly sloping, in the regions between the spacers.

6. The separating device according to claim 1, wherein the separating gap has a height, and wherein the height of the separating gap is from 50 to 1000 μm.

7. The separating device according to claim 1, wherein each annular disc comprises a material independently selected from the group consisting of (i) ceramic materials; (ii) mixed materials having fractions of ceramic or metallic hard materials and a metallic binding phase; and (iii) powder metallurgical materials with hard material phases formed in-situ.

8. The separating device according to claim 1, wherein the material of annular discs is sintered silicon carbide (SSiC) or boron carbide.

9. The separating device according to claim 1, further comprising, alone or in combination,
a perforated pipe, which is located inside the concentric stack of at least three annular discs and on which the annular discs are stacked,
an end cap at the upper end of the central annular region and an end cap at the lower end of the central annular region,
a shroud for protection from mechanical damage.

10. The separating device of claim 1, wherein a distance between spacers measured in a circumferential direction between the centers of the planar contact areas along their inside diameters is from 8 to 50 mm.

11. The separating device of claim 1, wherein the stack of comprises 3 to 500 annular discs.

12. The separating device of claim 1, wherein the elevation projecting from the upper side of the annular disc continuously extending along the entire outer circumference of the annular disc is separated from the spacers distributed over the circumference of the upper side of the annular disc by a portion of the upper side of the annular disc.

13. A separating device for removing solid particles from fluids, comprising:
a stack of at least three annular discs defining a central annular region along a central axis, each annular disc having an upper side and an underside, wherein every second annular disc in the stack each has two or more spacers distributed over the circumference of the upper side of the annular disc such that adjacent spacers are separated by an interspace corresponding to the distance between the adjacent spacers; and two or more spacers distributed over the circumference of the underside of the annular disc such that adjacent spacers are separated by an interspace corresponding to the distance between the adjacent spacers, and wherein the upper side and the underside of the respectively adjacent annular discs do not comprise any spacers, and wherein the spacers of the upper side of each annular disc contact the underside of the adjacent annular disc, and wherein the annular discs are stacked in such a way that a separating gap for the removal of solid particles is present in each case between adjacent annular discs, and wherein each of the one or more spacers have a planar contact area of between 4 and 100 mm$^2$ with the adjacent annular disc, and wherein every upper side of an annular disc which has one or more spacers has an elevation projecting from the upper side of the annular disc continuously extending along the entire outer circumference of the annular disc at the separating gap, and wherein every underside of an annular disc which has one or more spacers has an elevation projecting from the underside of the annular disc continuously extending along the entire outer circumference of the annular disc at the separating gap.

14. The separating device according to claim 13, wherein every upper side of an annular disc which does not comprise any spacers is formed at right angles to the central axis, and wherein every underside of an annular disc which does not comprise any spacers is formed at right angles to the central axis.

15. The separating device according to claim 13, wherein every upper side of an annular disc which does not comprise any spacers has a recess at the separating gap, and wherein every underside of an annular disc which does not comprise any spacers has a recess at the separating gap.

16. The separating device according to claim 15, wherein the recess comprises an area having a flat surface.

17. The separating device according to claim 13, further comprising, alone or in combination,
a perforated pipe, which is located inside the concentric stack of at least three annular discs and on which the annular discs are stacked,
an end cap at the upper end of the central annular region and an end cap at the lower end of the central annular region,
a shroud for protection from mechanical damage.

18. The separating device of claim 13, wherein a distance between spacers measured in a circumferential direction between the centers of the planar contact areas along their inside diameters is from 8 to 50 mm.

19. The separating device of claim 13, wherein the stack of comprises 3 to 500 annular disc.

20. The separating device of claim 13, wherein the elevation projecting from the upper side of the annular disc is separated from the spacers distributed over the circumference of the upper side of the annular disc by a portion of the upper side of the annular disc, and the elevation projecting from the underside of the annular disc is separated from the spacers distributed over the circumference of the underside of the annular disc by a planar portion of the underside of the annular disc.

\* \* \* \* \*